US010776405B2

(12) United States Patent
Duan et al.

(10) Patent No.: US 10,776,405 B2
(45) Date of Patent: Sep. 15, 2020

(54) MECHANISM AND APPARATUS OF SPATIAL ENCODING ENABLED MULTI-SCALE CONTEXT JOIN

(71) Applicant: International Business Machines Corporation, Armonk, NY (US)

(72) Inventors: Ning Duan, Beijing (CN); Yu Huang, Beijing (CN); Zhi Hu Wang, Beijing (CN); Xin Zhang, Beijing (CN); Jun Zhu, Shanghai (CN)

(73) Assignee: International Business Machines Corporation, Armok, NY (US)

( * ) Notice: Subject to any disclaimer, the term of this patent is extended or adjusted under 35 U.S.C. 154(b) by 840 days.

(21) Appl. No.: 15/221,723

(22) Filed: Jul. 28, 2016

(65) Prior Publication Data
US 2018/0032597 A1    Feb. 1, 2018

(51) Int. Cl.
*G06F 16/29*    (2019.01)
*G06F 16/22*    (2019.01)
(52) U.S. Cl.
CPC .......... *G06F 16/29* (2019.01); *G06F 16/2282* (2019.01)
(58) Field of Classification Search
CPC ...................................................... G06F 16/29
USPC ........................................................ 707/713
See application file for complete search history.

(56) References Cited

U.S. PATENT DOCUMENTS

| 7,239,989 | B2 | 7/2007 | Kothuri |
| 7,379,936 | B2 | 5/2008 | Kothuri et al. |
| 10,007,677 | B1* | 6/2018 | Hines ................... G06F 16/248 |
| 2006/0026170 | A1* | 2/2006 | Kreitler ............... G06F 16/9537 |
| 2012/0054195 | A1 | 3/2012 | Hu et al. |
| 2014/0359510 | A1* | 12/2014 | Graf .................... G01C 21/3614 715/771 |
| 2015/0254302 | A1 | 9/2015 | Hu et al. |
| 2015/0317358 | A1 | 11/2015 | Hu et al. |
| 2015/0324423 | A1* | 11/2015 | Wang ..................... G06F 16/21 707/603 |
| 2017/0110093 | A1* | 4/2017 | Stein ........................ G09G 5/30 |

OTHER PUBLICATIONS

Malensek, M. "Polygon-Based Query Evaluation over Geospatial Data Using Distributed Hash Tables", Department of Computer Science Colorado State University, pp. 1-8, printed Jul. 26, 2016, Fort Collins, USA.

* cited by examiner

*Primary Examiner* — Syling Yen
(74) *Attorney, Agent, or Firm* — Scully, Scott, Murphy & Presser, P.C.; Joseph Petrokaitis, Esq.

(57) ABSTRACT

A hierarchical spatial encode structure stored on a computing device is disclosed. The hierarchical spatial encode structure includes a plurality of scale levels having a plurality of encode expressions for a multi-scale context. The encode expressions on a first of the scale levels may include a first length. The encode expressions on a second of the scale levels may include a second length greater than the first length. Each encode expression of the second of the scale levels may include one or more of the encode expressions of the first of the scale levels. A context of the first of the scale levels may have a contain/nest (contained) spatial relation to a context of the second of the scale levels.

14 Claims, 26 Drawing Sheets

| Context | Context Measures | Data Size (e.g. Annual for U.S) |
|---|---|---|
| Road condition | Road type, Road terrain | ~ 10 TB |
| Land usage | density of population, ... | ~ 500 GB |
| POI | Density of POIs, ... | ~ 100 TB |
| Traffic condition | Traffic pattern | ~ X00 TB |
| Speed Condition | Speed pattern | ~X00 TB |
| weather | Weather type, temperature, pressure, ... hail, ... | ~ X00 TB |
| Air quality | PM2.5, AQI, ... | ~ X00 TB |
| Traffic Event | Driving behaviors, incidents, ... | ~ X000 TB |
| ... | ... | |

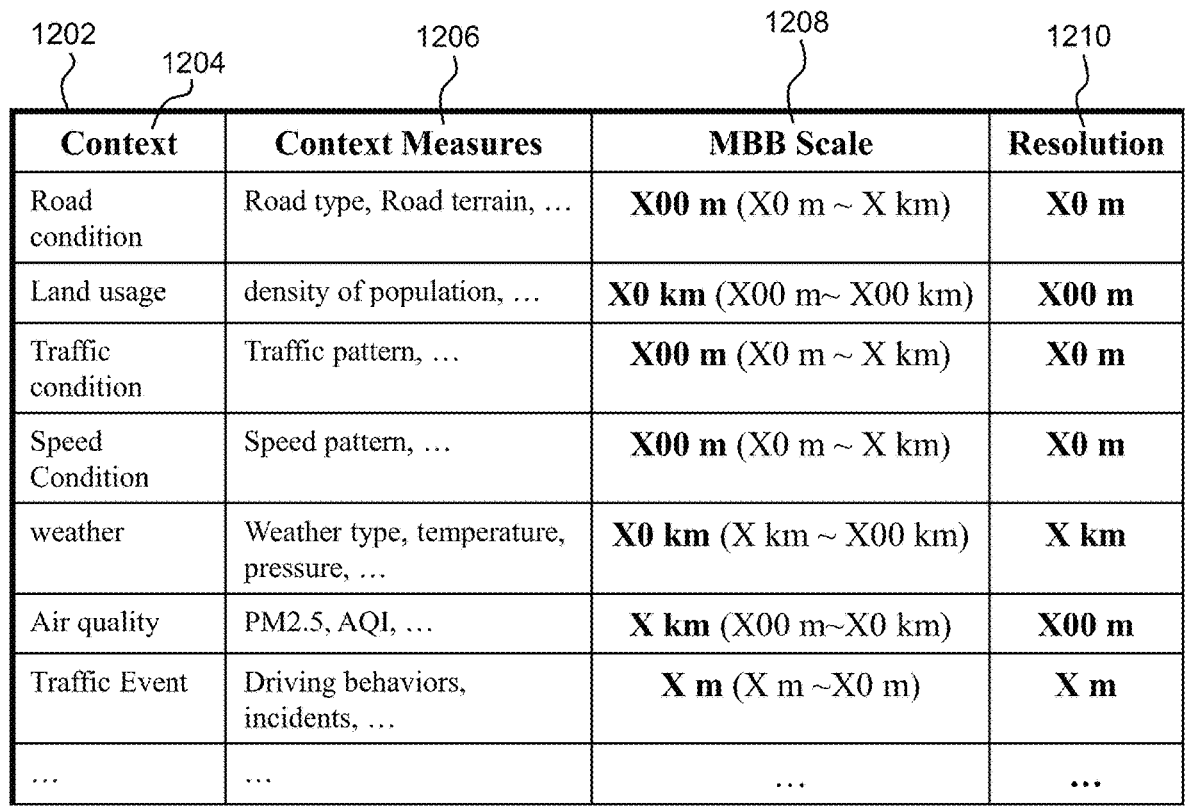

| Context | Context Measures | MBB Scale | Resolution |
|---|---|---|---|
| Road condition | Road type, Road terrain, ... | X00 m (X0 m ~ X km) | X0 m |
| Land usage | density of population, ... | X0 km (X00 m~ X00 km) | X00 m |
| Traffic condition | Traffic pattern, ... | X00 m (X0 m ~ X km) | X0 m |
| Speed Condition | Speed pattern, ... | X00 m (X0 m ~ X km) | X0 m |
| weather | Weather type, temperature, pressure, ... | X0 km (X km ~ X00 km) | X km |
| Air quality | PM2.5, AQI, ... | X km (X00 m~X0 km) | X00 m |
| Traffic Event | Driving behaviors, incidents, ... | X m (X m ~X0 m) | X m |
| ... | ... | ... | ... |

FIG. 12

*Possible start keys and their meaning*

| Command | Description |
|---|---|
| <userId> | Scan over all messages for a given ID. |
| <userId>-<date> | Scan over all messages on a given date for the given ID. |
| <userId>-<date>-<messageId> | Scan over all parts of a message for a given user ID and date. |
| <userId>-<date>-<messageId>-<attachmentId> | Scan over all attachments of a message for a given user ID and date. |

FIG. 16

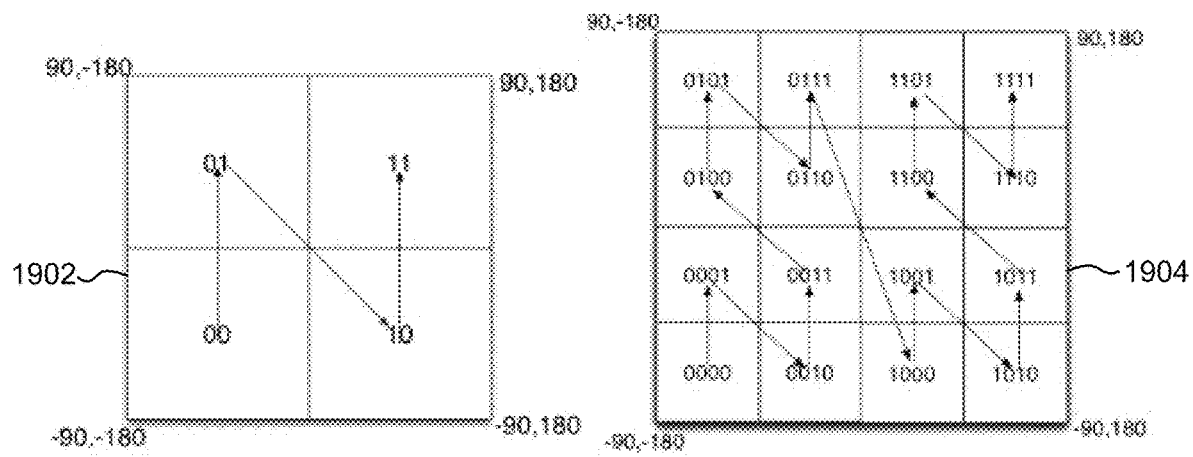
FIG. 19
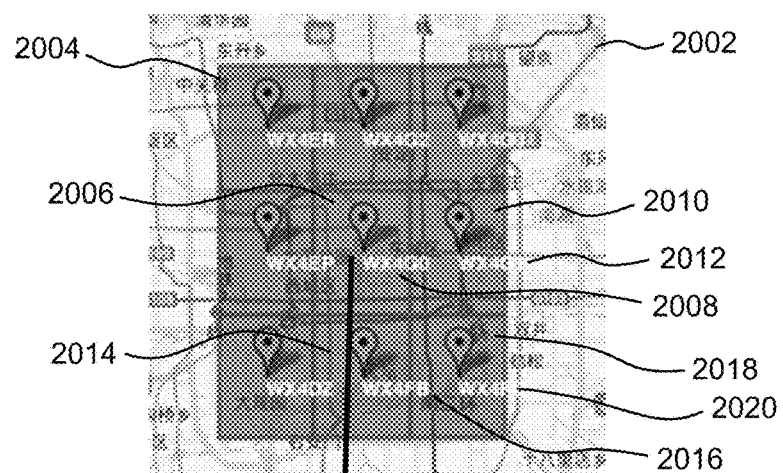
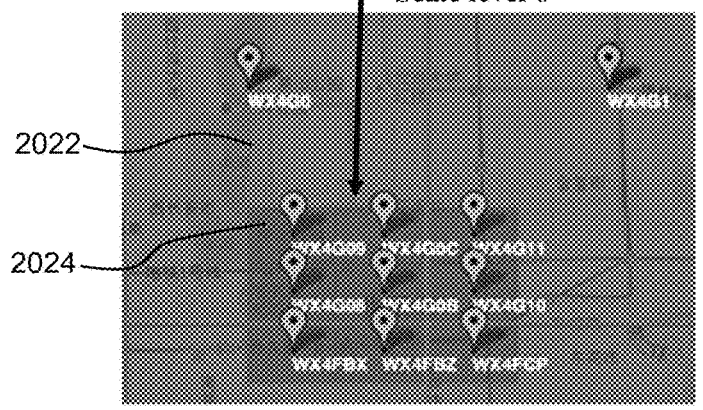
FIG. 20

Polygon

LineString

Point [Grid]

```
                    2602
             ⊙ type : "ContextCollection"
          [] contexts
2604         [0]
2606            contextId : "roadLink__OSM__bj35531__roadCondition__OSM"
2608            mapFeatureURI : "mapfeatures/roadLink__OSM__bj35531"
                status : "static"
2610            contextSource : "OSM"
2612            contextType : "roadCondition"
2614            measures
             [1]
2616            contextId : "roadLink__OSM__bj33359__roadCondition__OSM"
                mapFeatureURI : "mapfeatures/roadLink__OSM__bj33359"
                status : "static"
                contextSource : "OSM"
                contextType : "roadCondition"
                measures
             [2]
                contextId : "roadLink__OSM__bj35532__roadCondition__OSM"
                mapFeatureURI : "mapfeatures/roadLink__OSM__bj35532"
                status : "static"
                contextSource : "OSM"
                contextType : "roadCondition"
                measures
             [3]
             [4]
             [5]
             [6]
             [7]
             [8]
             [9]
             [10]
             [11]
             [12]
             [13]
```

FIG. 26

```
                    2702
                     │
                     ▼
         ┌─ [▓▓▓]
         │                     ─ 2704
         └─[] contexts ────────
              └─[0]──── 2706   ── 2708
                   ─ contextId : "grid4__MOMA__wx4e__dailyWeather__Source"
                   ─ mapFeatureRef
  2710 ─────────────── mapFeatureId : "grid4__MOMA__wx4e"
                       ─ geometry
                          ─[] coordinates ──── 2716
  2712 ─────────────────── type : "Polygon" ──── 2718
                       ─ properties ──── 2720
  2714 ─────────────── type : "Feature" ──── 2722
                   ─ contextSource : "Source" ──── 2724
                   ─ contextType : "dailyWeather"
                   ─ measures                            ── 2726
  2728 ─────────────── sunset : "6:13 pm"
                       ─ weatherType : "PM Rain" ── 2732
  2730 ─────────────── sunrise : "5:59 am"
  2734 ─────────────── MOMAWeatherType : "rainy" ── 2736
                       ─ temperature : "12, 27"
  2738 ─────────────── time : "2015-09-22 00:00:00.0"
                       ─ status : "dynamic"
  2740 ─────── type : "ContextCollection"
                      │
                    2742
```

FIG. 27 contextType, contextSource, contextCategory, featureType, featureSource, status, sampleRate, scaleLevel, featureKind roadCondition,OSM,road,roadLink,OSM,static,,7,fixed
dailyWeather,Company A,weather,grid4,MOMA,dynamic,daily,4,fixed
hourlyWeather,Company A,weather,grid4,MOMA,dynamic,hourly,4,fixed
airQuality,PMIn,AQ,AQStation,PM,dynamic,hourly,6,fixed
hail24HourAlert,WSI,alert,hailAlertRegion,WSI,dynamic,randomly,5,changed
hailZone30MinAlert,WSI,alert,hailAlertRegion,WSI,dynamic,randomly,5,changed
DRB,MOMA,event,DRBLocation,MOMA,dynamic,randomly,8,changed

FIG. 29

MECHANISM AND APPARATUS OF SPATIAL ENCODING ENABLED MULTI-SCALE CONTEXT JOIN

FIELD

The present application relates generally to context based spatial queries in No-SQL databases.

BACKGROUND

The surrounding environment of a specific location may be referred to as the context of that location. In general, context of a location may change dynamically over time or may be stable. For example, weather, traffic conditions, road conditions, terrain, and other similar environmental conditions of a location may change dramatically depending on the time of day, day of the week, month, time of year, season, etc. Context becomes relevant in connected vehicles where, for example, the context of a specific location, e.g., a particular road that must be traversed, may be relevant for determining what actions the vehicle should take.

BRIEF SUMMARY

The methods, systems, and computer program products described herein provide a hierarchical spatial encode structure for multi-scale context encoding.

In an aspect of the present disclosure, a hierarchical spatial encode structure stored on a computing device is disclosed. The hierarchical spatial encode structure includes a plurality of scale levels having a plurality of encode expressions for a multi-scale context. The encode expressions on a first of the scale levels may include a first length. The encode expressions on a second of the scale levels may include a second length greater than the first length. Each encode expression of the second of the scale levels may include one or more of the encode expressions of the first of the scale levels. A context of the first of the scale levels may have a contain/nest (contained) spatial relation to a context of the second of the scale levels.

In an aspect of the present disclosure, a system is disclosed. The system includes at least one processor, at least one data repository operatively associated with the at least one processor, and memory operatively associated with the at least one processor. The at least one data repository is configured to store a hierarchical spatial encode structure including a plurality of scale levels each having a plurality of encode expressions for a multi-scale context. The memory stores instructions that, when executed by the at least one processor, configure the at least one processor to receive context data and to identify a scale level of the context data. The instructions further configure the at least one processor to translate the received context data into the hierarchical spatial encode structure based at least in part on the identified scale level. The instructions further configure the at least one processor to receive a query for one or more contexts of the hierarchical spatial encode structure. The query may include a spatial scale input as a condition. The instructions further configure the at least one processor to compare the spatial scale input to a scale level of the one or more contexts of the hierarchical spatial encode structure and determine based on the comparison whether the spatial scale input is greater than, equal to, or less than the scale level for the one or more contexts. If the spatial scale input is determined to be greater than the scale level for the one or more contexts, the instructions further configure the at least one processor to scale down the length of an encode expression for the one or more contexts to match the spatial scale input and submit a row key based query to the hierarchical spatial encode structure based at least in part on the scaled down length of the encode expression. If the spatial scale input is less than the scale level for the one or more contexts, the instructions further configure the at least one processor to scale up the length of the encode expression for the one or more contexts to match the spatial scale input and submit a row key based query to the hierarchical spatial encode structure based at least in part on the scaled up length of the encode expression. If the spatial scale input is the same as the scale level for the one or more contexts, the instructions further configure the at least one processor to submit a row key based query to the hierarchical spatial encode structure based at least in part on the length of the encode expression. The instructions further configure the at least one processor to return, based on the submitted row key based query, one or more contexts that match the query.

In an aspect of the present disclosure, a method performed by at least one hardware processor is disclosed including receiving a query for one or more contexts of a hierarchical spatial encode structure. The query may include a spatial scale input as a condition. The hierarchical spatial encode structure may include a plurality of scale levels each having a plurality of encode expressions for a multi-scale context. The method may further include comparing the spatial scale input to a scale level of the one or more contexts of the hierarchical spatial encode structure, based on the comparison, at least one of scaling down the length of an encode expression for the one or more contexts, scaling up the length of an encode expression for the one or more contexts, or leaving the length of an encode expression for the one or more contexts unchanged. The length of the encode expression may be scaled down when the spatial scale input is greater than the scale level of the one or more contexts. The length of the encode expression may be scaled up when the spatial scale input is less than the scale level for the one or more contexts. The length of the encode expression may be left unchanged when the spatial scale input is the same as the scale level for the one or more contexts. The method may further include submitting a row key based query to the hierarchical spatial encode structure based at least in part of the scaled up, scaled down, or unchanged length of the encode expression, and receiving from the hierarchical spatial encode structure one or more contexts that match the row key based query.

In aspects of the present disclosure apparatus, systems, and computer program products in accordance with each of the above aspects may also be provided.

Further features as well as the structure and operation of various embodiments are described in detail below with reference to the accompanying drawings. In the drawings, like reference numbers indicate identical or functionally similar elements.

BRIEF DESCRIPTION OF THE SEVERAL VIEWS OF THE DRAWINGS

FIG. 4 is a table of example contexts including context measures and data size in accordance with an aspect of the present disclosure.

FIG. 12 is a table of example contexts including context measures, minimum bounding box (MBB) scales and resolutions in accordance with an aspect of the present disclosure.

FIGS. 14-16 are diagrams and tables associated with a No-SQL database in accordance with an aspect of the present disclosure.

FIG. 19 is an illustration of an example of a translation of a unified spatial coordinate system of an encode in accordance with an aspect of the present disclosure.

FIG. 20 is an illustration of the relationship between a scale level 5 and scale level 6 encode context maps in accordance with an aspect of the present disclosure.

FIG. 26 is an illustration of an example query result including a scale down of the encode in accordance with an aspect of the present disclosure.

FIG. 27 is an illustration of an example query result including a scale up of the encode in accordance with an aspect of the present disclosure.

FIGS. 28 and 29 are illustrations of example scale level meta definitions for contexts in accordance with an aspect of the present disclosure.

DETAILED DESCRIPTION

In connected vehicles, e.g., vehicles having data communication capabilities for wirelessly receiving or transmitting data, context data is becoming richer and may be critical for understanding the vehicle/operator and enabling smarter services. Each connected vehicle not only runs within its own context, i.e., a context specific to its current location, but also may contribute sensor data that may be used to construct a global context fusion model. The context of a location may include a variety of layered dimensions including, for example, weather, traffic conditions, road conditions, or other similar conditions that may affect the location. Vehicles may include, for example, bikes, automobiles, trains, helicopters, planes, drones, or any other vehicle that may be connected to use or provide context data.

The context of a location may be measured and represented by, for example, a value within a spatial-scope during a temporal-scope.

In some aspects, the value of the context for a location may include weather conditions such as, for example, snow, rain, sleet, hail, or other types of weather. In some aspects, the value of the context for a location may include traffic conditions such as, for example, high traffic volume, delays, accidents, emergency vehicle activity, or types of traffic conditions. In some aspects, the value of the context for a location may include road conditions such as, for example, wet roads, icy roads, dry roads, slushy roads, slippery roads, highways, local roads, well maintained or "good" roads, relatively unmaintained or "bad" roads, or any other road condition. The value of the context may include any other value that may affect the location. In some aspects, the value of the context may be received from multiple and heterogeneous data sources. For example, weather values may be received from in-vehicle sensors, from sensors on other vehicles, from local sensor sites (e.g., local radar), from private companies or national institutions (e.g., meteorologists, the National Oceanic and Atmospheric Administration (NOAA), etc.), or from other similar sources.

The spatial-scope of the context may include location or orientation information such as, for example, longitude, latitude, GPS coordinates, attitude, altitude, road link, country, zip code area, or any other location or orientation information.

The temporal-scope of the context may include any time related information such as, for example, a specific time, peak hour, day, or any other period of time.

Figure 1:
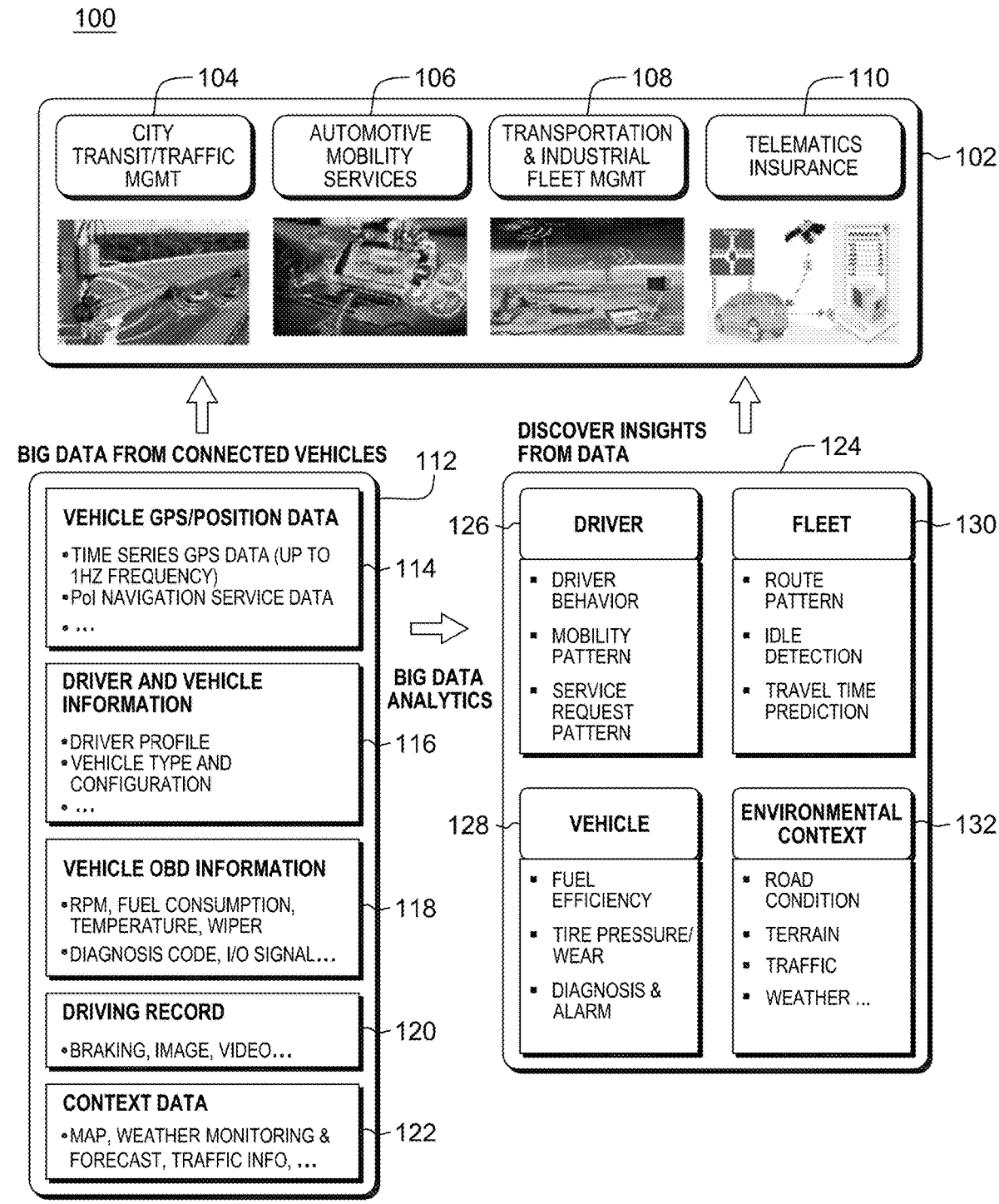
FIG. 1 is a diagram of context related data in accordance with an aspect of the present disclosure.

Referring now to FIG. 1, an example system 100 that uses context data is provided. System 100 illustrates a variety of entities 102 that may utilize context data to track or make determinations on courses of action. Some entities 102 may include, for example, city transit and traffic management entities 104, automotive mobility services 106, transportation and industrial fleet management entities 108, telemantics insurance 110, and other similar entities. Various types of data may be received by entities 102 from connected vehicles 112 including, for example, vehicle GPS/position data 114 (e.g., time series GPS data, point of interest (PoI) navigation service data, etc.), driver and vehicle information 116 (e.g., driver profile, vehicle type and configuration, etc.), vehicle on-board diagnostic (OBD) information 118 (e.g., revolutions per minute (RPM), fuel consumption, temperature, wiper status (on or off, wiper speed, etc.), diagnosis codes, input/output signals, etc.), driving records 120 (e.g., braking data, images, videos, etc.), and context data 122 (e.g., map, weather monitoring and forecasting, traffic information, etc.).

The data from the connected vehicles may also be analyzed, for example, by big data analytics 124, to determine additional information about the driver 126 (e.g., driving behavior, mobility pattern, service request pattern, etc.), vehicle 128 (e.g., fuel efficiency, tire pressure/wear, diagnosis and alarms, etc.), fleet of vehicles 130 (e.g., route patterns, idle detection, travel time prediction, etc.), and environmental context 132 (e.g., road condition, terrain, traffic, weather, etc.). The additional information may also be provided to entities 102.

Figure 2:
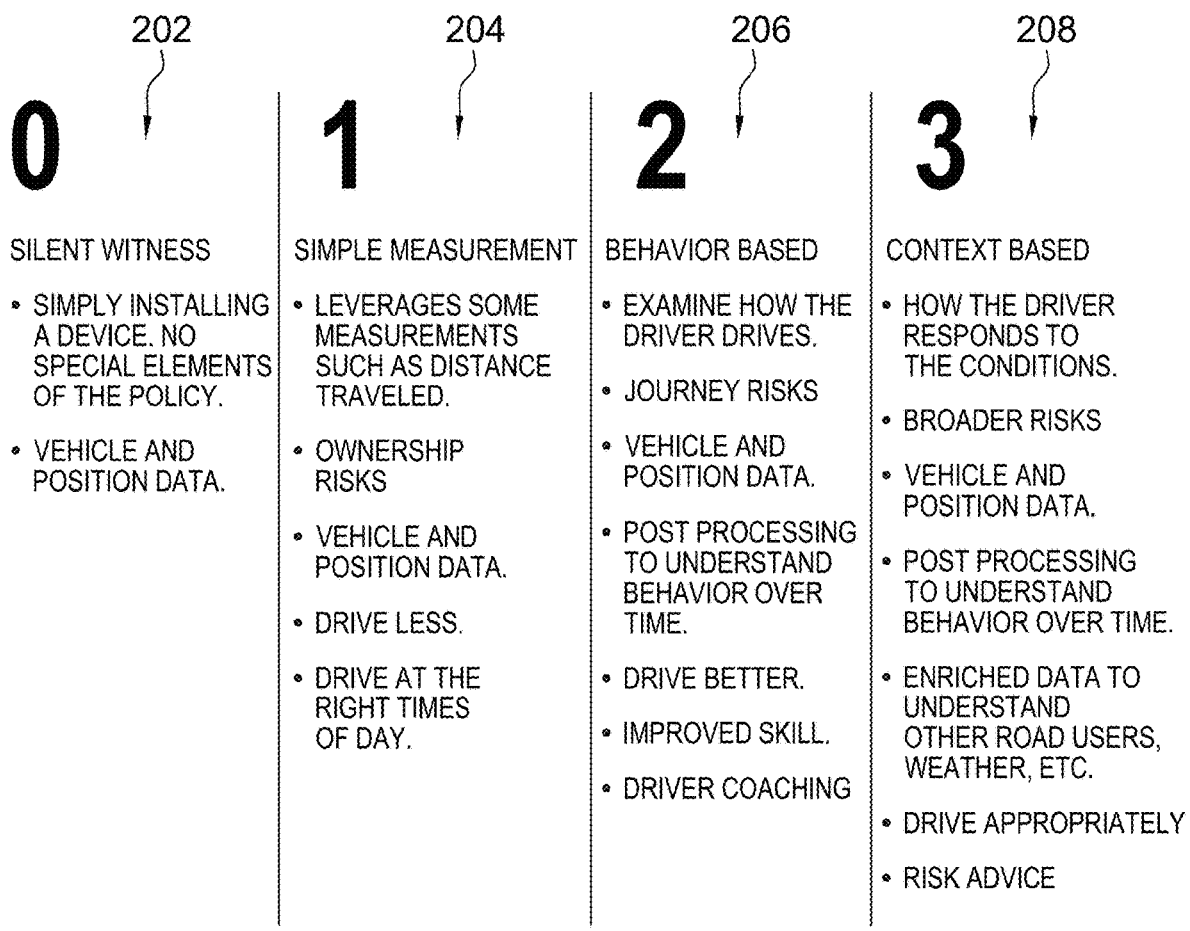
FIG. 2 is a diagram of risk models in accordance with an aspect of the present disclosure.

Referring now to FIG. 2, various levels of telematic insurance models are disclosed. Each successive level may include the features of the prior level.

A "zero" level model 202 may, for example, be a silent witness scheme including the installation of a device that provides vehicle and position data without any specific policy elements.

A "first" level model 204 may, for example, be a simple measurement scheme that leverages measurements such as the distance traveled and ownership risks. Model 204 may also measure vehicle and position data and make determinations or suggestions to drive less or drive at certain times of the day to reduce insurance costs.

A "second" level model 206 may, for example, be a behavior based scheme that examines how a driver drives and determines journey risks. Model 206 may also measure vehicle and position data and may perform post processing on the vehicle and position data to track the behavior of the driver over time. Model 206 may make determinations or suggestions to a driver to drive better, track improvements to the driver skills, and provide driver coaching to improve the drivers driving.

A "third" level model 208 may, for example, be a context based scheme that considers how a driver responds to various road conditions, vehicle conditions, and environmental factors. Model 208 may take into account broader driving risks than models 202, 204, and 206 and may determine or measure vehicle and position data, perform post processing to understand behavior over time, and may utilized enriched context data about road conditions, weather, or other environmental factors. The Context based data may be utilized to discover risk context conditions for driving. For example, context data may be tracked and compared with driving data to determine which contexts correlate with and/or result in more or less risky driving behaviors, increased or decreased numbers of claims, increased or decreased numbers of accidents, etc. Model 208 may, for example, determine whether the driver is driving appropriately and provide risk advice. The risk advice may be personalized to the driver and may be provided in real-time. Model 208 may be used to develop driver scores, for example, to determine which drivers are "good" drivers, e.g., lower risk of accidents, claims, etc., and which drivers are "bad" drivers, e.g., higher risk of accidents, claims, etc. The driver scores may be based on a contextual personalized profile developed for each driver based on the measured and tracked context, vehicle, position, and other driving data.

Figure 3:
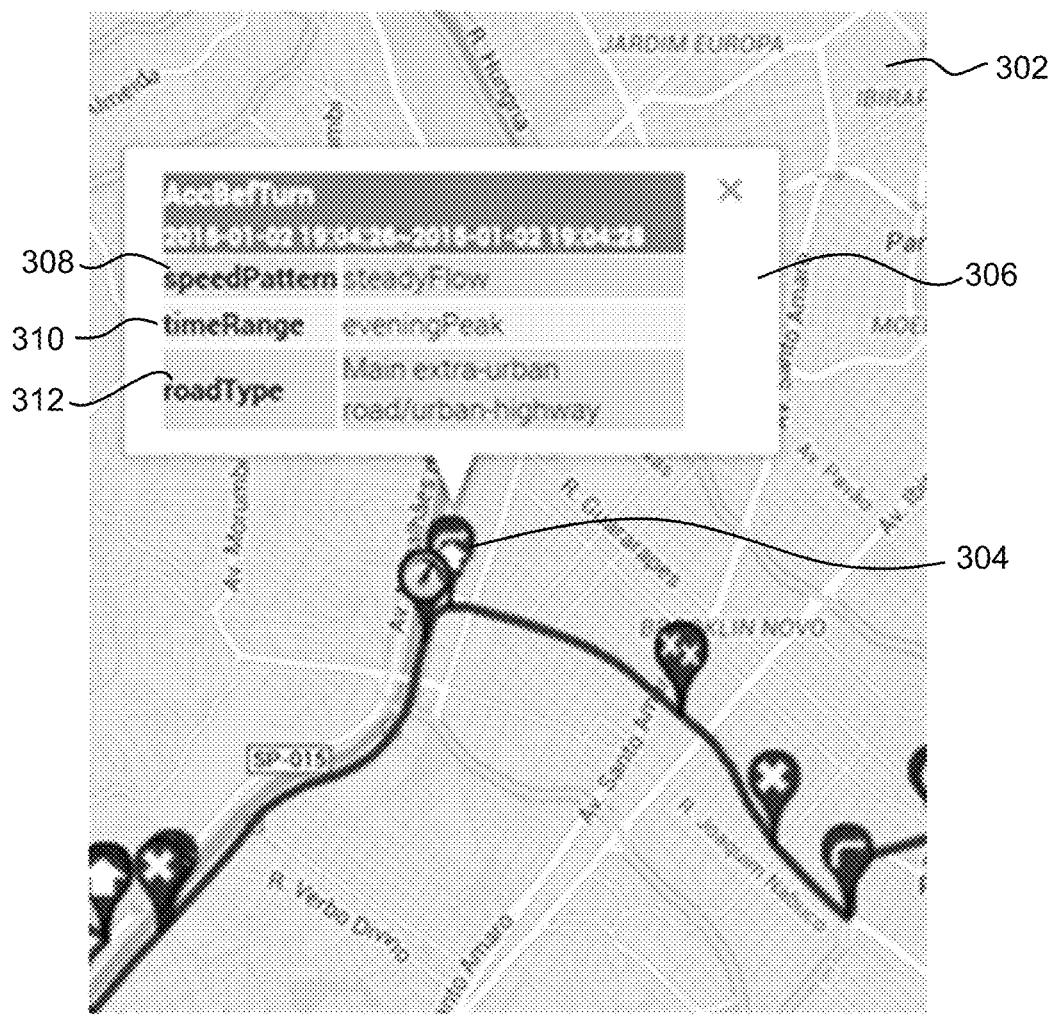
FIG. 3 is an illustration of a context map in accordance with an aspect of the present disclosure.

Referring now to FIG. 3, an example map 302 with contextual information is illustrated. Map 302 may be presented, for example, via a display screen of a computing device as part of a graphical user interface. An indicator 304 may be present on the map 302 indicating a location having contextual information. Indicator 304 may be selected or activated, for example, by a user of the computing device, to present a contextual information view 306. View 306 may be displayed separately from map 302 or may be displayed as an overlay over map 302. Contextual information view 306 may include contextual information about the location indicated by indicator 304. For example, contextual information view 306 may include contextual information about a speed pattern 308 at the location, a time range 310, and a road type 312 at the location. Speed pattern 308 may include, for example, steady flow, light traffic, heavy traffic, standstill, or other similar traffic patterns that may be found at the location. Time range 310 may indicate a particular time window in which the contextual information is provided. For example, time range 310 may include early morning, pre-morning peak, morning peak, post morning peak, early afternoon, pre-evening peak, evening peak, post-evening peak, night, or any other similar time range. Road type 312 may include any relevant road conditions including, for example, highway, parkway, side road, service road, paved road, dirt road, path, residential street, etc. Road type 312 may also include an indication of whether the road is found in an urban, rural, or other similar zone.

Referring now to FIG. 4, each context 402 may include a unit of measurement 404 and may include a yearly data size 406 requirement for storing the context 402. Example contexts 402 may include road conditions, land usage, points of interest, traffic conditions, speed conditions, weather, air quality, traffic events, or any other context that may impact drivers on roads. Each context 402 may include a different measurement system. For example, road condition may include a measurement of road type, and road terrain. Road type may be, for example, highway, parkway, local streets, etc. Road terrain may include, for example, paved, dirt, gravel, etc. Road terrain may also include, for example, hilly terrain, flat terrain, mountains, bridges/rivers, swamps, etc. As another example, the land usage context 402 may have a context measure 404 of population density. The data for each context 402 also has different storage requirements. For example, road conditions contexts 402 may require approximately ten terabytes of storage on an annual basis while point of interest contexts 402 may require approximately one-hundred terabytes of storage on an annual basis.

Figure 5:
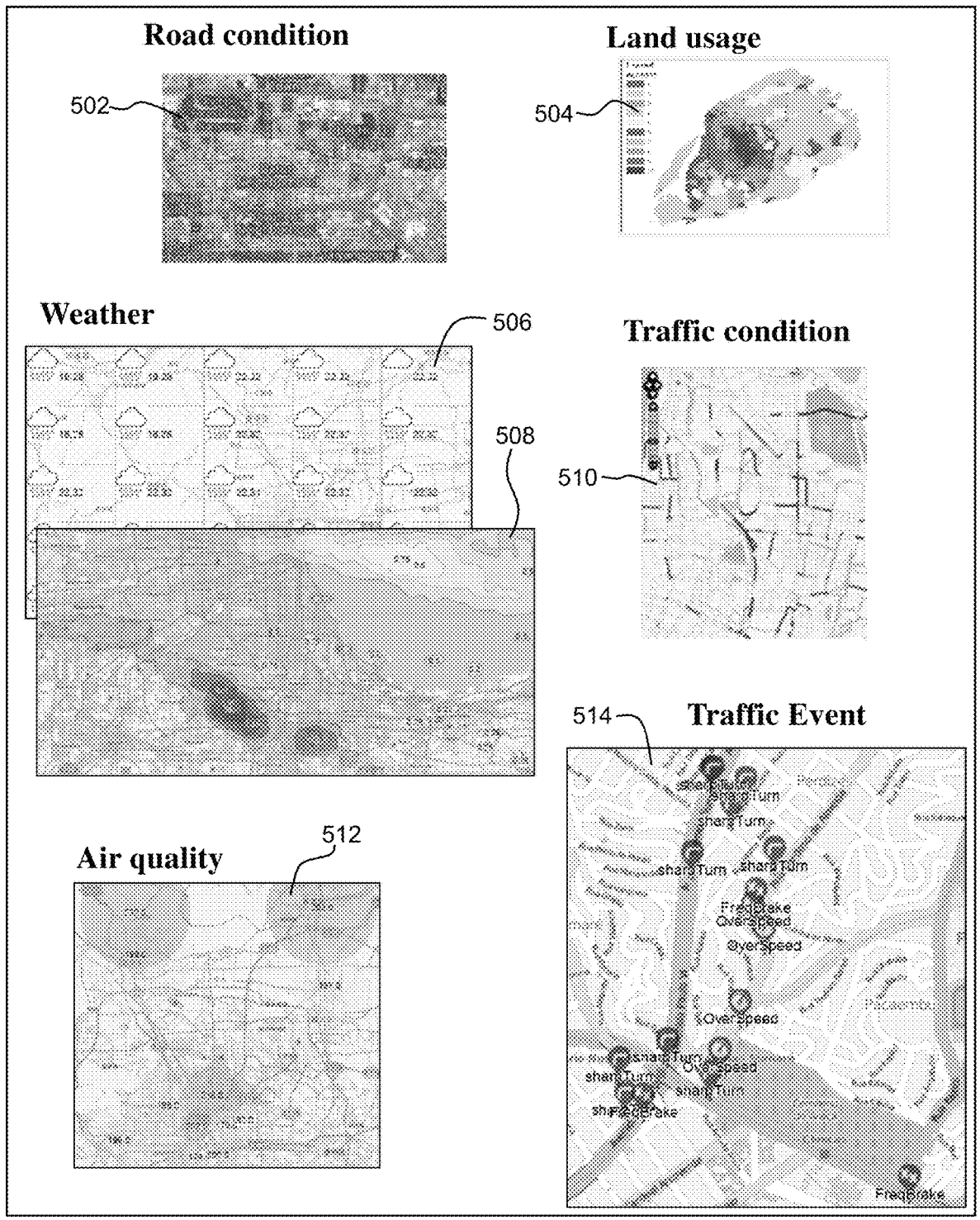
FIG. 5 is an illustration of example context maps in accordance with an aspect of the present disclosure.

Referring now to FIG. 5, examples of various contexts 402 from FIG. 4 are illustrated. For example, the road conditions context 402 may include a map 502 of road conditions. The land usage context 402 may include a land usage map 504. The weather context 402 may include a map 506 presenting weather in each region of the map and a radar map 508 presenting the weather as received from a radar system. The traffic condition context 402 may include a traffic map 510 showing areas of congestion. The air quality context 402 may include an air quality map 512 showing regions where air quality may be an issue. The traffic event context 402 may including a traffic event map 514 presenting locations where traffic events, e.g., accidents, areas where traffic congestion increases such as, for example, sharp turns, downward slopes, road mergers, areas where many drivers are frequently braking, etc.

In some aspects, a context may include a variety of characteristics. For example, each context may include multiple different resolutions or scales. As an example, the weather context may include weather over a large region, e.g., the eastern United States, weather over a moderate sized region, e.g., an individual state, weather over a small region, e.g., a particular city, town, village, etc.

Figure 6:
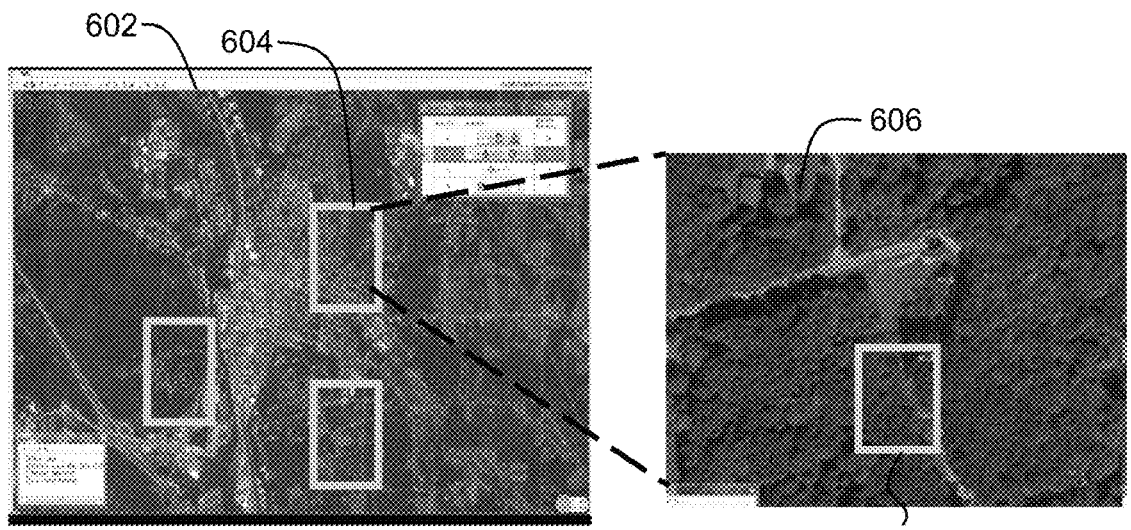
FIGS. 6-8 are illustrations of context base queries and alerts in accordance with an aspect of the present disclosure.
Figure 7:
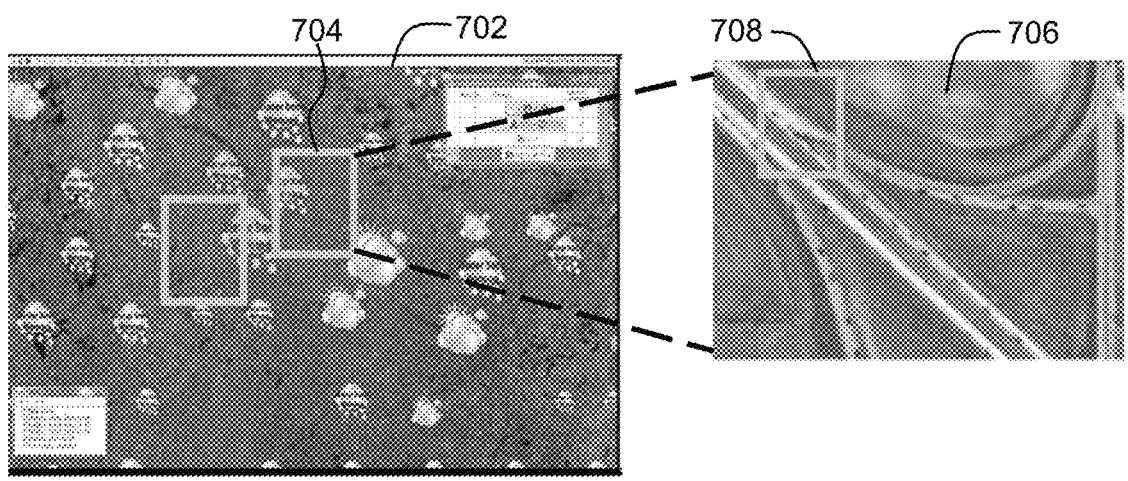

Referring now to FIGS. 6 and 7, in some aspects, real-time alerts may be provided to a user via a display of a computing device. For example, as illustrated in FIG. 6, a graphic user interface including a map 602 may be presented on the display. Map 602 may, for example, be a map of a region of interest to a driver, e.g., map 602 may be centered on the driver, may be a map of a city or region in which the driver is currently driving, or other similar interest. Map 602 may include alert regions 604 indicating a region where a potential alert can be found. Alerts may include, for example, individual contexts, e.g., sharp turn, weather, etc., or may, in some aspects, including a combination of contexts, e.g., a sharp turn area (context of road network) having heavy rain (context of weather) to a vehicle running over 80 km/hr (context of speed pattern). Map 602 may be presented at a first resolution, for example, a resolution showing an entire city or region. In some aspects, alert regions 604 may be selected or activated to present a map 606 having a higher resolution, e.g., a resolution showing a particular road or intersection area. Another alert region 608 may be presented indicating a higher resolution region where the potential alert may be found. Alert region 608 may also be selected or activated to present another map having increased resolution and more specific detail on the alert.

As illustrated in FIG. 7, a graphic user interface including a map 702 may be presented on the display. Map 702 may, for example, be a map of a region of interest to a driver, e.g., map 702 may be centered on the driver, may be a map of a city or region in which the driver is currently driving, or other similar interest. Map 702 may include alert regions 704 indicating a region where a potential alert can be found. Another example of an alert may include, for example, a freeway entrance (context of road network) area with fog/snow (context of weather) and dark light (context of vehicle lighting). Map 702 may be presented at a first resolution, for example, a resolution showing an entire city or region. In some aspects, alert regions 704 may be selected or activated to present a map 706 having a higher resolution, e.g., a resolution showing the freeway entrance. Another alert region 708 may be presented indicating a higher resolution region where the potential alert may be found. Alert region 708 may also be selected or activated to present another map having increased resolution and/or more specific detail on the alert.

Figure 8:
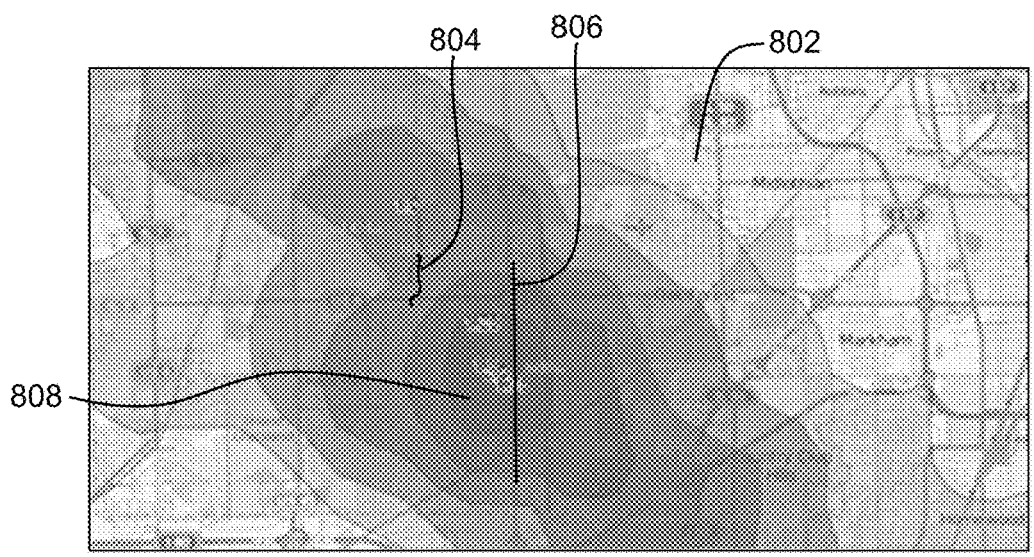

Referring now to FIG. 8, a graphic user interface including a map 802 may be presented on the display. Map 802 may, for example, be a map of a region of interest to a driver, e.g., map 802 may be centered on the driver, may be a map of a city or region in which the driver is currently driving, or other similar interest. Map 802 may include road links 804, 806 for which alerts are present. For example, the road links 804, and 806 may be darkened lines indicating the portions of roads that are within the alert area. Map 802 may also present an indication 808 of a weather pattern, e.g., severe storms, hail, etc. that is the cause of the alert. Indication 808 may be presented, for example, as a gradient of color and/or shape. For example, the severity of the weather pattern may be indicated by a color, e.g., a dark color for higher severity and a lighter color for lower severity. As can be seen from map 802, road links 804 and 806 may intersect or even be encompassed within the indication 808. Map 802 may provide a real-time notification to drivers within indication 808 on road links 804 and 806 that the road links 804 and 806 are within a severe weather pattern. Map 802 may also provide a severity of the weather pattern or each road link 804 and 806 to the drivers on the road links 804 and 806.

Figure 9:
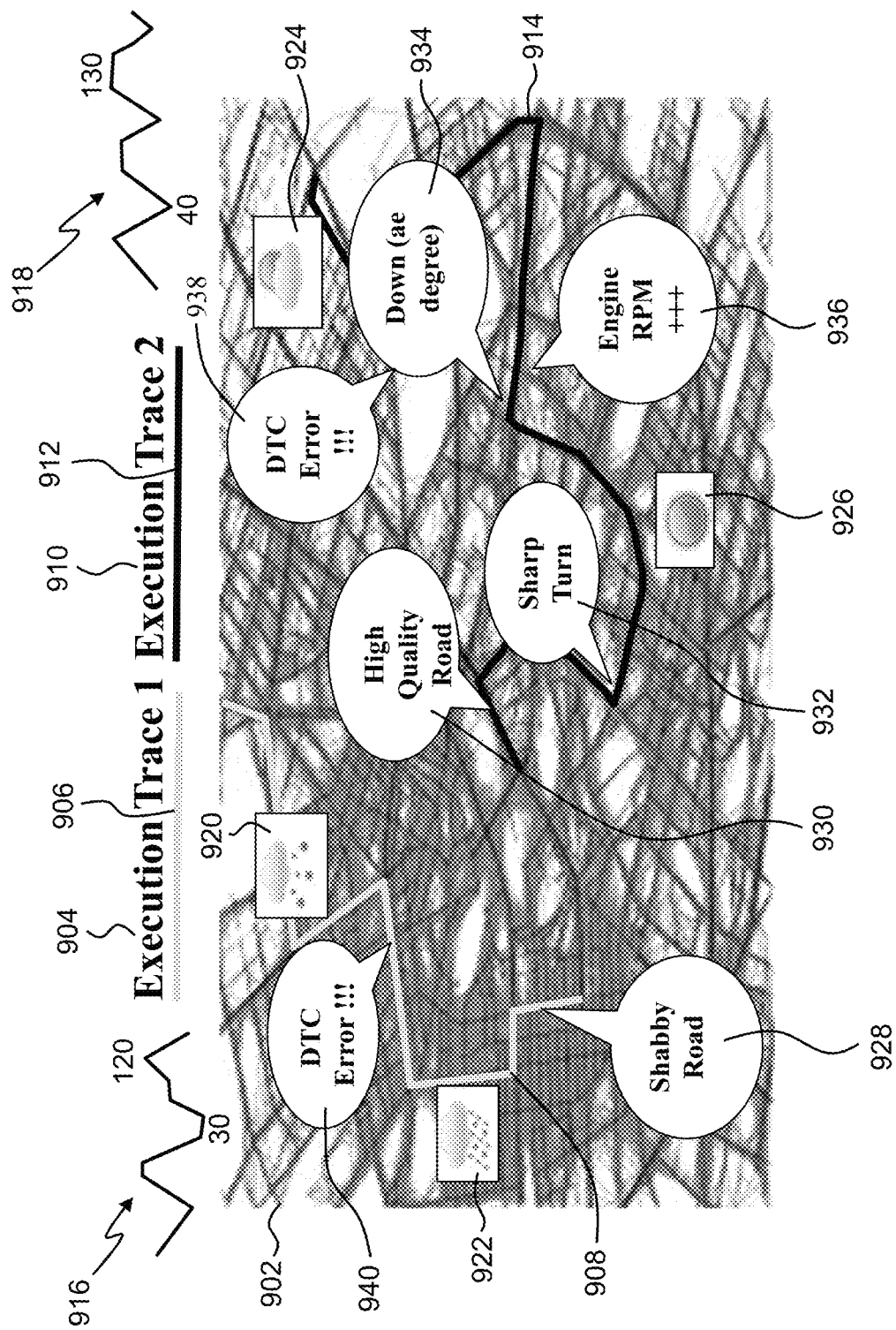
FIG. 9 is an illustration of context query event analysis in accordance with an aspect of the present disclosure.

Referring now to FIG. 9, an example of a context tracking map 902 for vehicles is illustrated. Context tracking map 902 may track contextual requirements and vehicle speeds. For example, context tracking map 902 may track different road quality levels, e.g., symbols 928 and 930, downward and upward slopes (e.g., slopes of more than 5, 10, 15, 20, 25, 30 or any other number of degrees), e.g., symbol 934, weather patterns such as sunny, rainy, and snowy days, e.g., symbols 920, 922, 924, and 926, straight road segments and/or turns, e.g., symbol 932. Context tracking map 902 may also gather and verify key performance and stability metrics of a vehicle for acceleration (e.g., 60 km/h to 65 km/hr within one second or any other values) and deceleration (e.g., from 65 km/h to 60 km/hr within one second or any other values).

Context tracking map 902 includes first and second execution traces 904 and 910. First execution trace 904 corresponds to a light colored identifying marker 906 which is also presented on map 902 along a route 908. Second execution trace 910 corresponds to a dark colored identifying marker 912 which is also presented on map 902 along a route 914. Execution traces 906 and 910 track the characteristics and movement of vehicles along route's 908 and 914 respectively. For example, a speed of the vehicle along route 908 is tracked and may be charted by a chart 916 and the speed of the vehicle along route 914 may be tracked and may be charted by a chart 918.

Chart 916 shows that the vehicle reached a maximum speed of one hundred and twenty kilometers/hour and a minimum speed of thirty kilometers per hour. As can be seen from chart 916, as the vehicle moves along route 908, the speed may vary substantially based on the surrounding context of the vehicle. For example, the vehicle may slow down by a first amount as the vehicle enters a region having moderate rain as indicated by symbol 920 and may accelerate to a higher speed after leaving the region of moderate rain, the vehicle may slow down a second, larger amount, as the vehicle enters a region having heavy rain as indicated by symbol 922, may once again speed up after leaving the region of heavy rain, and may again slow down when entering a region having a shabby road as indicated by symbol 928.

Chart 918 shows that the vehicle reached a maximum speed of one hundred and thirty kilometers/hour and a minimum speed of forty kilometers per hour. As can be seen from chart 918, as the vehicle moves along route 914, the speed may vary substantially based on the surrounding context of the vehicle. For example, the vehicle may accelerate due to a high quality road as indicated by symbol 930, slow down as the vehicle approaches a sharp turn as indicated by symbol 932, accelerates in an area of sun as indicated by symbol 926, slows down in an area having a down degree as indicated by a symbol 934, speeds up once leaving the area having the down degree, and may again slow down when entering a partly cloudy region as indicated by symbol 924.

In some aspects, context errors 938 and 940 (e.g. Diagnostic Trouble Codes (DTC) indicating abnormal motor engine speed) may also be tracked, for example, where data is not received from the vehicle or data about a context is not available. In some aspects, driving characteristics of the vehicle may also be tracked, for example, abnormally high engine RPM situations may be tracked as shown by symbol 936.

Figure 10:
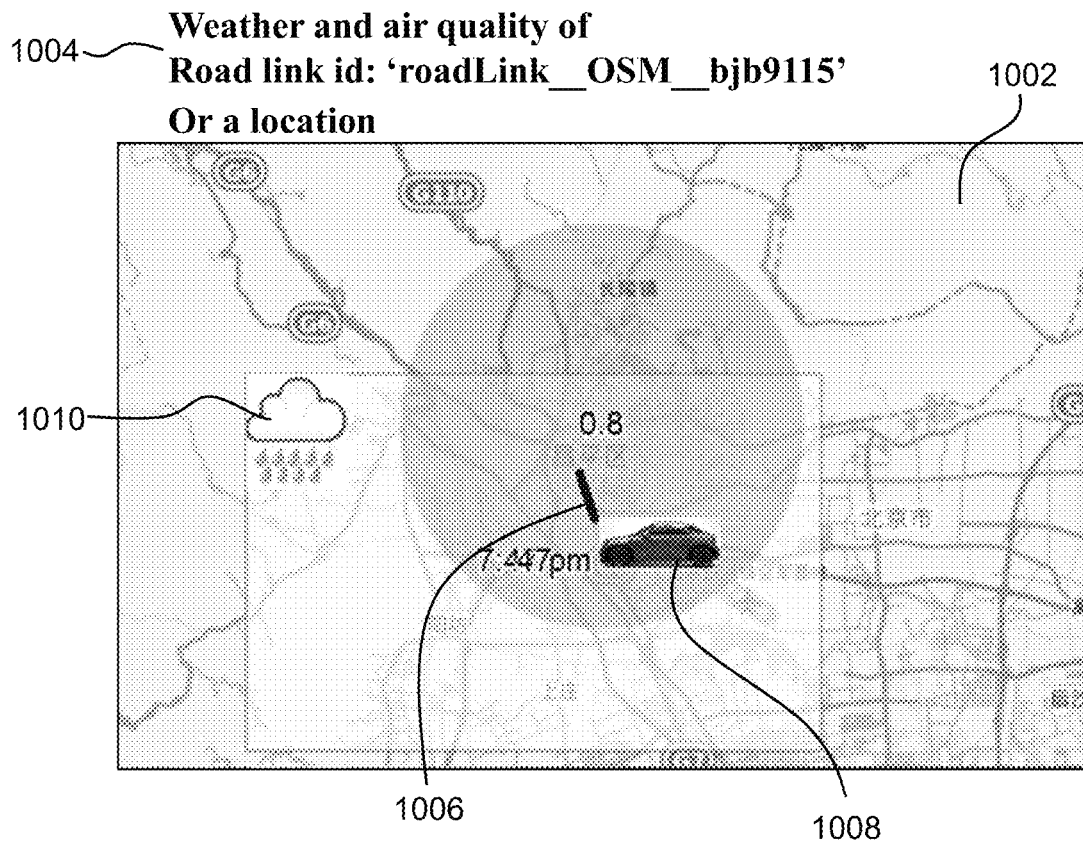
FIGS. 10 and 11 are illustrations of context maps including surrounding context information of connected vehicles in accordance with an aspect of the present disclosure.
Figure 11:
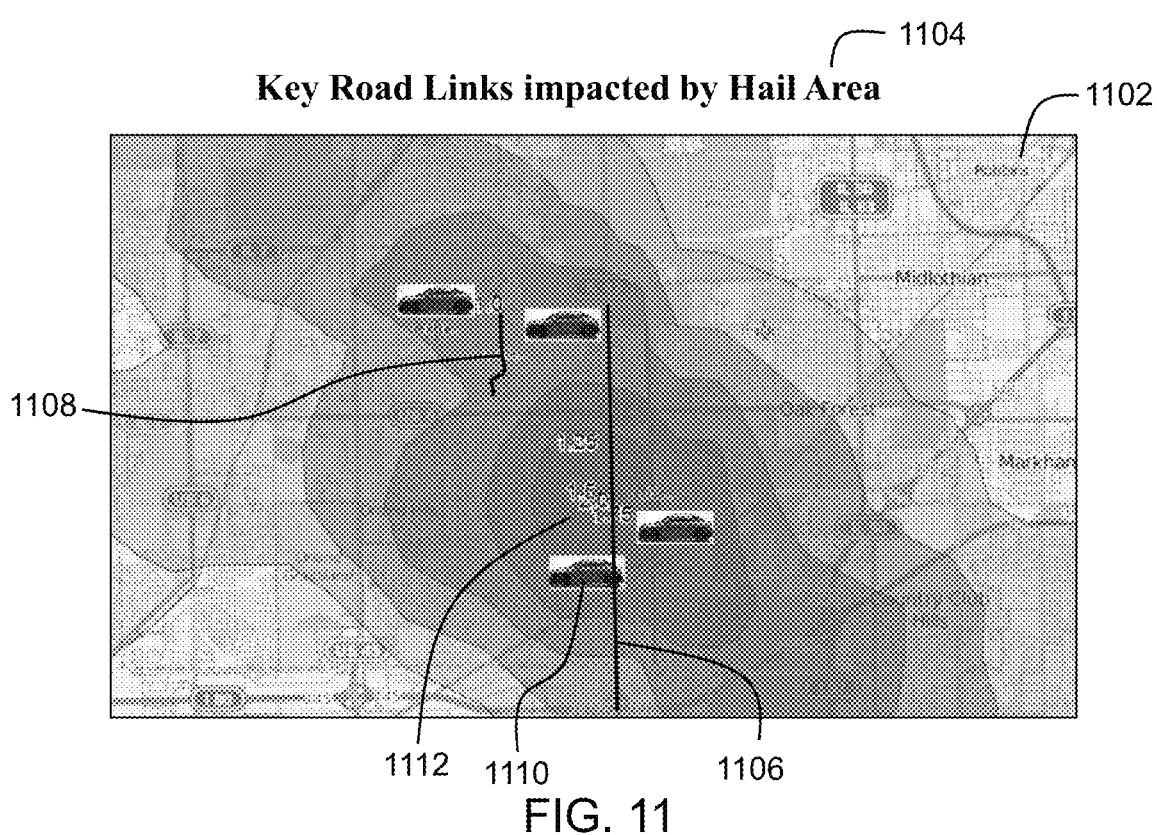

The context of surrounding information for a moving object, e.g., a connected vehicle, may include two special query requirements. First, finding surrounding contexts from a moving object/location/road link/etc., and second finding the moving objects/location/road links/etc., impacted by the specific contexts. For example, as illustrated in FIG. 10, a map 1002 may include a context 1004 for a road link 1006, e.g., weather and air quality, and a vehicle 1008. As can be seen from FIG. 10, the vehicle on the road link is within a region 1010 indicated as having a weather pattern, e.g., rain. In another aspect, as illustrated in FIG. 11, a map 1102 may include a context 1104, e.g., key road links impacted by hail area, for road links 1106 and 1108 and vehicles 1110. As can be seen from FIG. 11, the vehicles 1110 on the road links 1106 and 1108 are within a region 1112 having the indicated weather pattern, e.g., hail. In general, context based special queries for connected vehicles emphasize a Contain/nest (Contained) relation rather than an intersection or near relation but can cover intersection (part is in the Contain) or near (approximate to Contain with offset radius). For example, in FIG. 10, from the perspective of a road link or a vehicle 1008, the query is to lookup whether a road link or vehicle is within a region of weather which is a typical nest (contained) relation. As another example, in FIG. 11, from the perspective of a hail area, the query is to lookup which road links or vehicles are impacted by the hail area which is a typical Contain relation.

Referring now to FIG. 12, an example chart 1202 of different contexts and their corresponding resolutions is provided. Chart 1202 includes contexts 1204, for example, road conditions, land usage, traffic conditions, speed conditions, weather, air quality, traffic events, and other contexts. Each context may be measured by a context measure 1206. For example, the traffic condition context 1204 may be measured by a traffic pattern context measure 1206, e.g., low traffic, moderate traffic, high traffic, congestion, gridlock, or other similar traffic patterns. As another example, the traffic event context 1204 may be measured by context measures 1206 including, for example, driving behaviors, incidents, accidents, emergency services, etc. Each context 1204 includes a minimum bounding box (MBB) scale 1208 (e.g., a scale having a corresponding spatial grid of scale level that fully covers a current geometry of context at a minimal size). For example, the road condition context 1204 may include a MBB scale 1208 of X00m (X0m~Xkm), the land usage context 1204 may include a MBB scale 1208 of X0 km (X00m~X00 km), etc. Each context 1204 also has a resolution 1210. For example, the road condition context 1204 may have a resolution 1210 of X0m, the land usage context 1204 may have a resolution of X00m, etc. In the above description, the variable X may include any digit between 0 and 9.

Figure 13:
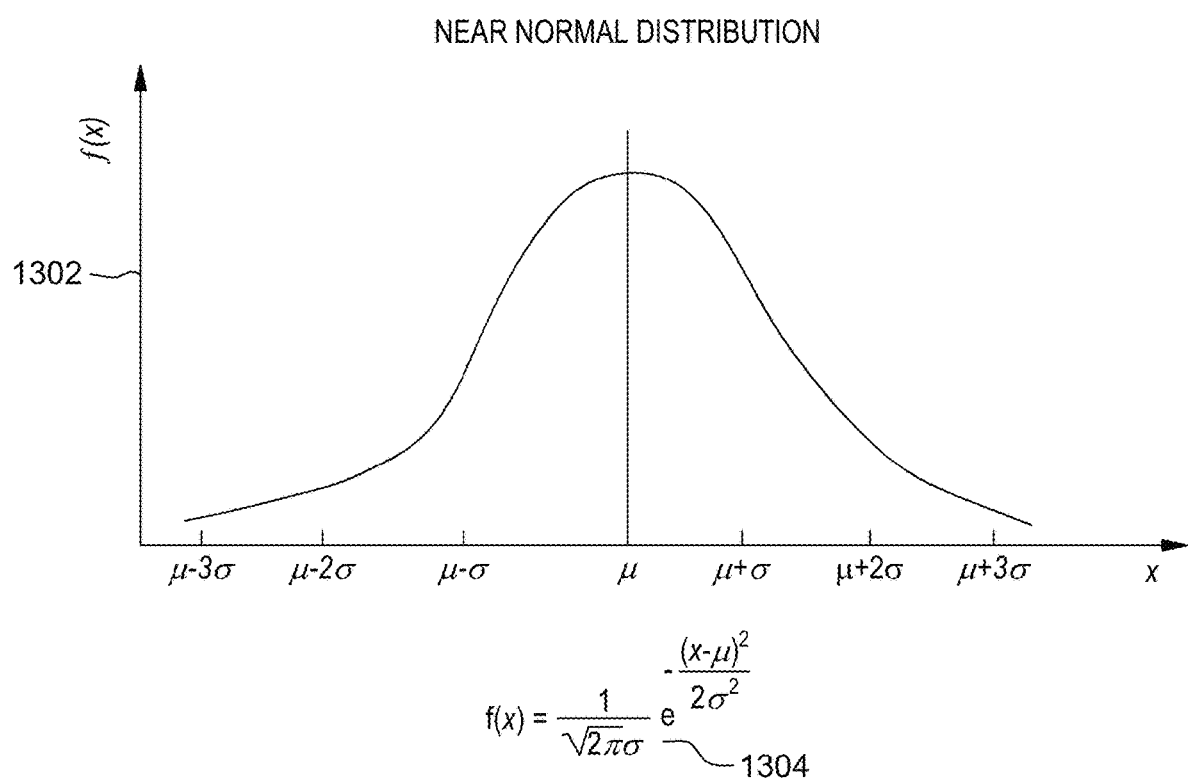
FIG. 13 is a diagram of the distribution of the context MBB scales in accordance with an aspect of the present disclosure.

For the same type of context 1204, distribution of the MBB scale 1208 (μ) follows a certain near normal distribution 1302 as illustrated, for example, in FIG. 13 according to equation 1304.

Figure 14:
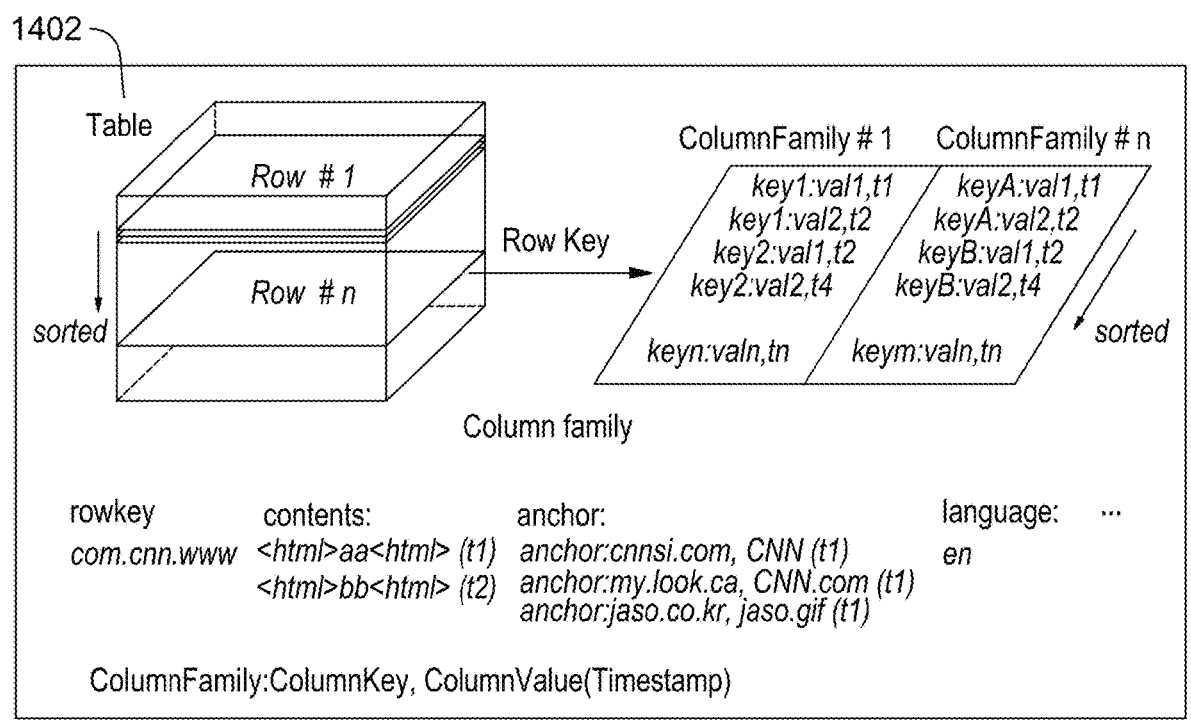
Figure 15:
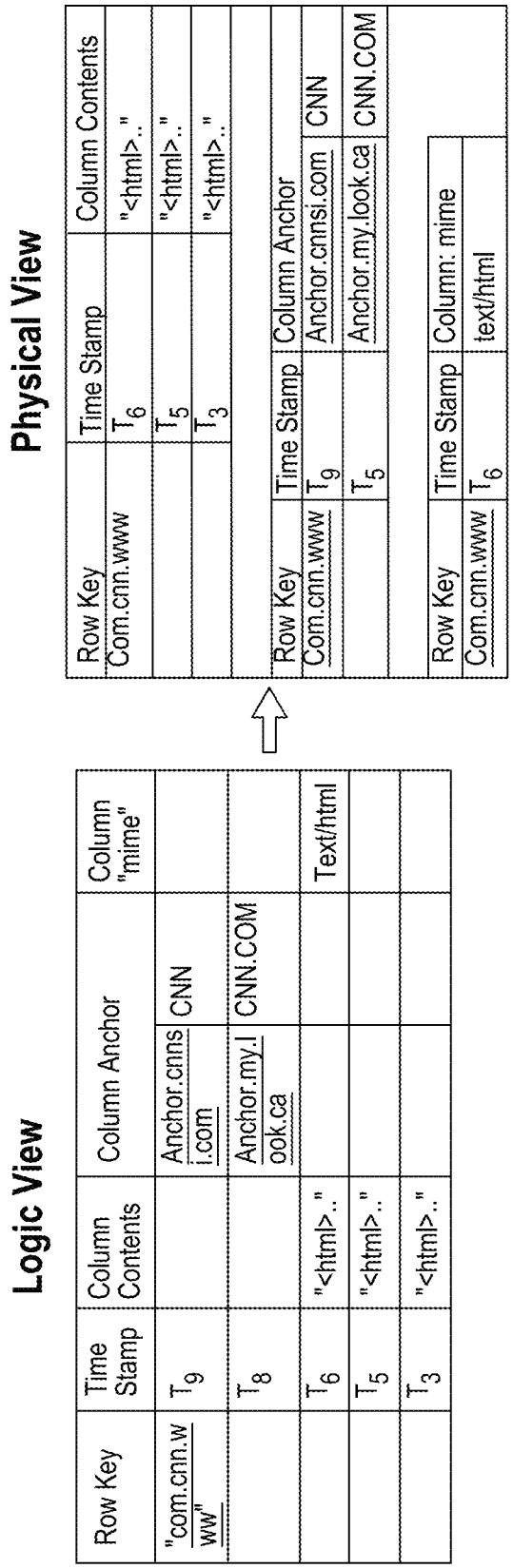

Referring now to FIGS. 14-16, an example No-SQL database 1402 is illustrated. No-SQL databases support multiple types of queries including query by single row key, range query by row key 'left-fuzzy', and full table scan (poor performance). A relevant consideration is how to translate a two dimensional special contain/nest relation to a one dimensional row key for use with the No-SQL database. In some aspects, a pre-built spatial encode may be used for the transition from the two dimensional special contain/nest relation to the one dimensional row key.

In general, once context information has been ingested into the system the context information is not changed. Because of this, an efficient query using a pre-built spatial relation by encode instead of original geometry based spatial computing may be used. Encode may be, for example, a string based code that may be Base32 based GeoHash encode or Hilbeat encode.

In aspects of the present disclosure, the native range scan of row-key of No-SQL (i.e., HBase, a standard key-value based No-SQL database in Hadoop® created by the Apache Software Foundation) may be used to directly perform spatial computing of the Contain/Nest (Contained) relation of the contexts. Since row-key range scan is natively supported by No-SQL databases with high performance, efficiency gains may be found. It is relevant to note that encode is directly spatial computing rather than spatial indexing.

Where traditional spatial indexing organizes spatial objects as indexing items, a spatial computing using encode first queries index items and then performs spatial computing to further filter the results. This results in a performance improvement of more than ten times.

Translating or encoding the two-dimensional spatial Contain/Nest(contained) relation as a one-dimensional unified pre-encode expression to support row key range queries in No-SQL databases is a non-trivial task. For example, encoding the two-dimensional spatial contain/nest (contained) as a one-dimensional pre-encode expression to dynamically adapt different spatial scales or resolutions of contexts while maintaining a high hit ratio is non-trivial. If the scale/resolution is too big, it may lead to the retrieval of useless contexts in response to a query which results in lower query efficiency. If the scale/resolution is too small, it may lead to redundant storage with results in low disk efficiency. For example, in B, B−, B+, and B* tree spatial indexing technologies, the value partition of longitude and latitude is leveraged to build the index but is only suitable for points.

Figure 17:
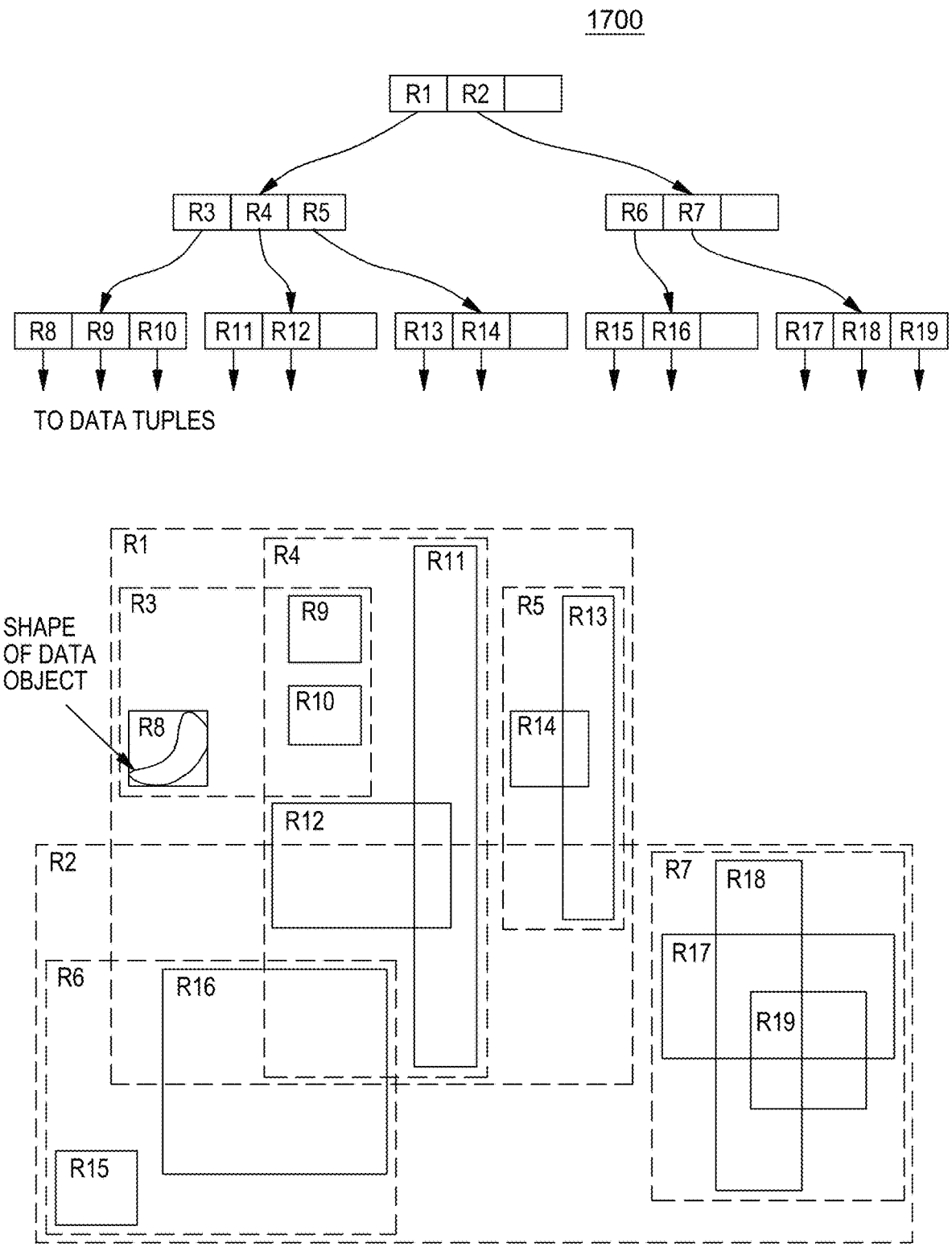
FIG. 17 is an illustration of an R Tree in accordance with an aspect of the present disclosure.

In R, R+, R*, QR, SS, and X tree spatial indexing technologies, objects are geometry driven with no unified coordinate system or encode to compare among objects. An example of an R tree 1700 is illustrated in FIG. 17. R, R+, R*, QR, SS, and X trees leverage a minimum bounding box (MBB) to index a geometry which may mostly prevent redundant object queries. R, R+, R*, QR, SS, and X trees also support changes and variability in an object geometry's scale size. However, due to the fact that the same type of contexts often have similar geometry scale size, there may be no need to support the dynamic changes and variability in an object geometry's scale size.

In grid spatial indexing technologies, the spatial granularity is unit based. Grid spatial indexing technologies utilize miscellaneous scales and provide a very low hit ratio.

Hierarchical Spatial Encode Structure

Figure 18:
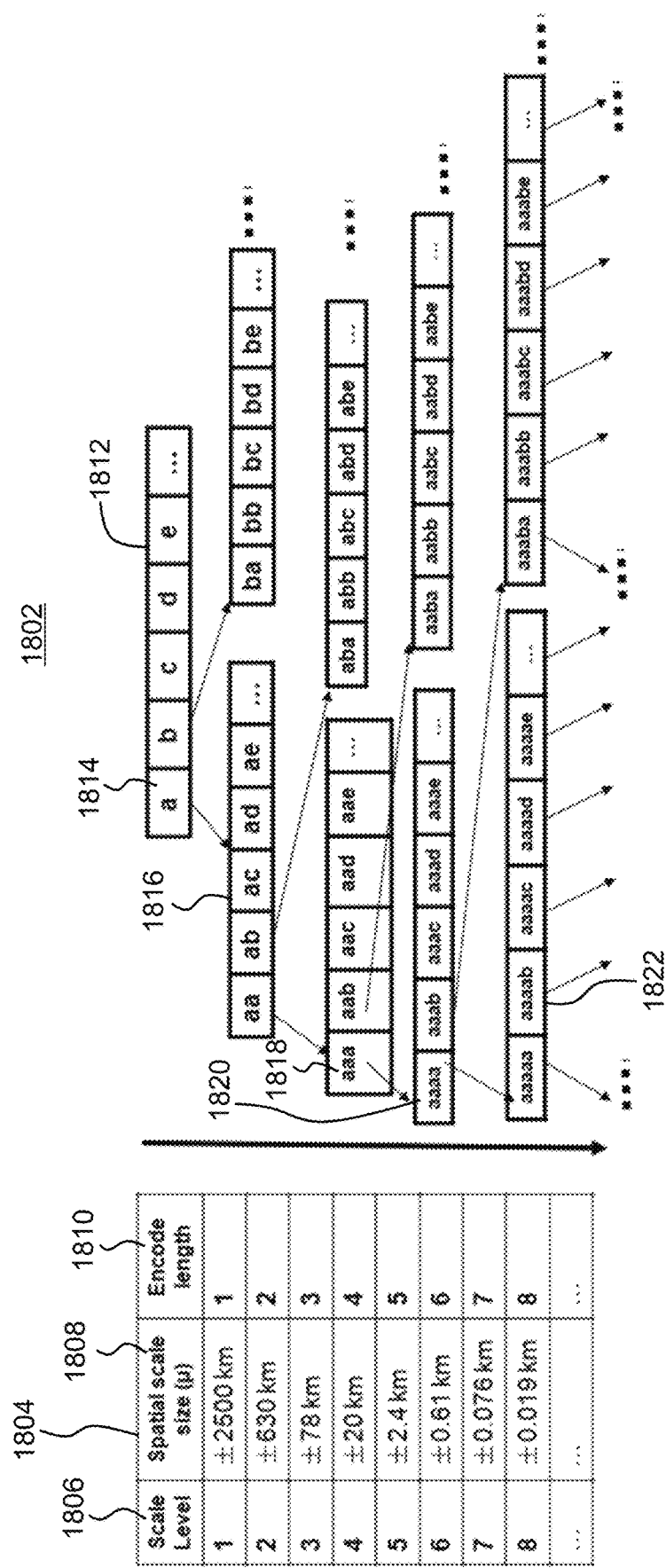
FIG. 18 is a diagram of a hierarchical spatial encode structure in accordance with an aspect of the present disclosure.

In some aspects, with reference now to FIG. 18, a hierarchical spatial encode structure 1802 is provided for encoding a two-dimensional spatial contain/nest (contained) relation as a one-dimensional unified pre-encode expression to support row key range queries in No-SQL databases. The encode structure 1802 pre-defines multi-scale level encode to match the different scales of different types of contexts. The encode structure 1802 also leverages a unified spatial coordination system to encode geometry of the contexts. The encode structure 1802 is hierarchical in the sense that the context of higher scale level and contexts of its corresponding low scale levels represent the contain/nest (contained) spatial relation. The encode expression is also "left-to-right" to support the "left fuzzy" range query of a No-SQL database.

As illustrated in FIG. 18, the encode structure 1802 includes a relationship table 1804 between scale level 1806, spatial scale size (μ) 1808, and encode length 1810. In some aspects, the scale level 1806 may be inversely proportionate to the spatial scale size 1808. For example, as the scale level 1806 increases in value, the spatial scale size 1808 may decrease in value. For example, as illustrated in FIG. 18, a scale level 1806 of "one" may correspond to a spatial scale size 1808 of +−2500 km, a scale level 1806 of "two" may correspond to a spatial scale size 1808 of +−630 km, etc. In some aspects, the scale level 1806 may alternatively be proportionate to the spatial scale size 1808. For example, as the scale level 1806 increases in value, the spatial scale size 1808 may also increase in value.

In some aspects, the scale level 1806 may be proportionate to the encode length 1810. For example, as the scale level 1806 increases in value, the encode length 1810 may also increase in value. For example, as illustrated in FIG. 18, a scale level 1806 of "one" may correspond to a encode length 1810 of "one", a scale level 1806 of "two" may correspond to a encode length 1810 of "two," etc. In some aspects, the scale level 1806 may alternatively be inversely proportionate to the encode length 1810. For example, as the scale level 1806 increases in value, the encode length 1810 may decrease in value.

As further illustrated in FIG. 18, a tree 1812 representing the encode structure 1802 is illustrated. A first level 1814 of tree 1812 corresponds to a scale level 1806 of "one". As can be seen from FIG. 18, first level 1814 includes encode lengths of "one", i.e., "a", "b", "c", "d", "e", etc. A second level 1816 of tree 1812 corresponds to a scale level 1806 of "two" and includes encode lengths of two, i.e., "aa", "ab", "ac", "ad", "ae", etc. A third level 1818 of tree 1812 corresponds to a scale level 1806 of "three" and includes encode lengths of "three", i.e., "aaa", "aab", "aac", etc. A fourth level 1820 of tree 1812 corresponds to a scale level 1806 of "four" and includes encode lengths of "four", i.e., "aaaa", "aaab", "aaac", etc. A fifth level 1822 of tree 1812 corresponds to a scale level 1806 of "five" and includes encode lengths of "five", i.e., "aaaaa", "aaaab", "aaaac", etc. Tree 1812 may continue with additional levels for each corresponding scale level and may include encode lengths corresponding to the encode lengths found in relationship table 1804 for each scale level 1806.

As further illustrated in FIG. 18, the relationship between each level may be based on the encode value. For example, where first level 1814 includes an encode value of "a", e.g., a region "a" having a spatial scale size 1808 of +−2500 km, the second level 1816 may include an encode value of "aa", e.g., a region within "a" having a spatial scale size 1808 of +−630 km, the third level 1818 may include an encode value of "aaa", e.g., a region within "aa" (and therefore within "a") having a spatial scale size 1808 of +−78 km, the fourth level 1820 may include an encode value of "aaaa", e.g., a region within "aaa" (and therefore within "aa" and "a") having a spatial scale size 1808 of +−20 km, the fifth level 1822 may include an encode value of "aaaaa", e.g., a region within "aaaa" (and therefore within "aaa", "aa", and "a") having a spatial scale size 1808 of +−2.4 km, and so on. As another example, the fifth level 1822 may include an encode value of "aaabd", e.g., a region within "aaab" (and therefore within "aaa", "aa", and "a") having a spatial scale size 1808 of +−2.4 km.

With reference now to FIG. 19, an example of a translation from a unified spatial coordination system to encode is illustrated. A Z-order based encode method, for example GeoHash, may be used to first split longitude (−180, 180) as two equivalent parts and split latitude (−90, 90) as two equivalent parts in 1902. If longitude is within (−180, 0), encode may be "0", and if longitude is within (0, 180), encode may be "1"; if latitude is within (−90, 0), encode may be "0", and if latitude is within (0, 90), encode may be "1". Then encode longitude and latitude together may be combined in the format "longitude latitude". For example, a point having a longitude (−45) and a latitude (20) may have an encode result of "01" Likewise, for example, a point having a longitude (30) and a latitude (10), may have an encode result of "11". In 1904, the grids generated by 1902 may be further split into next level minor grids using similar methods.

With reference now to FIG. 20, a translation from a scale level 1806 of "five" to a scale level 1806 of "six" is illustrated. A map 2002 at a scale level 1806 of "five" includes regions 2004, e.g., nine regions. Regions 2004 include a central region 2006 having an encode 2008 of "WX4G0", a first adjacent region 2010 having an encode 2012 of "WX4G1", a second adjacent region 2014 having an encode 2016 of "WX4FB", and a region 2018 adjacent to regions 2010 and 2014 having an encode 2020 of "WX4FC". The map 2022 at a scale level 1806 of "six" includes regions 2024 that are in the hierarchy of regions 2006, 2010, 2014, and 2018. For example, four of the regions 2024 are in the hierarchy of central region 2006, e.g., the regions having encodes "WX4G08", "WX4G09", "WX4G0B", and "WX4G0C", two of the regions 2024 are in the hierarchy of region 2010, e.g., the regions having encodes "WX4G10" and "WX4G11", two of the regions 2024 are in the hierarchy of region 2014, e.g., the regions having encodes "WX4FBX" and "WX4FBZ", and one of the regions 2024 is in the hierarchy of region 2018, e.g., the region having the encode "WX4FCP". Thus, at a scale level 1806 of "six", the encodes include the corresponding code length 1810 of "six" from relational table 1804, e.g., six letters and/or numbers, and includes the entire encode of the next lower scale level 1806. For example, a region 2024 at the scale level 1806 of "six" may include an encode of "WX4G0" with the addition of an "8" ("WX4G08"), indicating that the region is the eighth region included within the region identified by encode "WX4G0," a region having a scale level 1806 of "five" (as denoted by the encode length of five letters and/or numbers).

MBB Scale Size and Resolution Oriented

Figure 21:
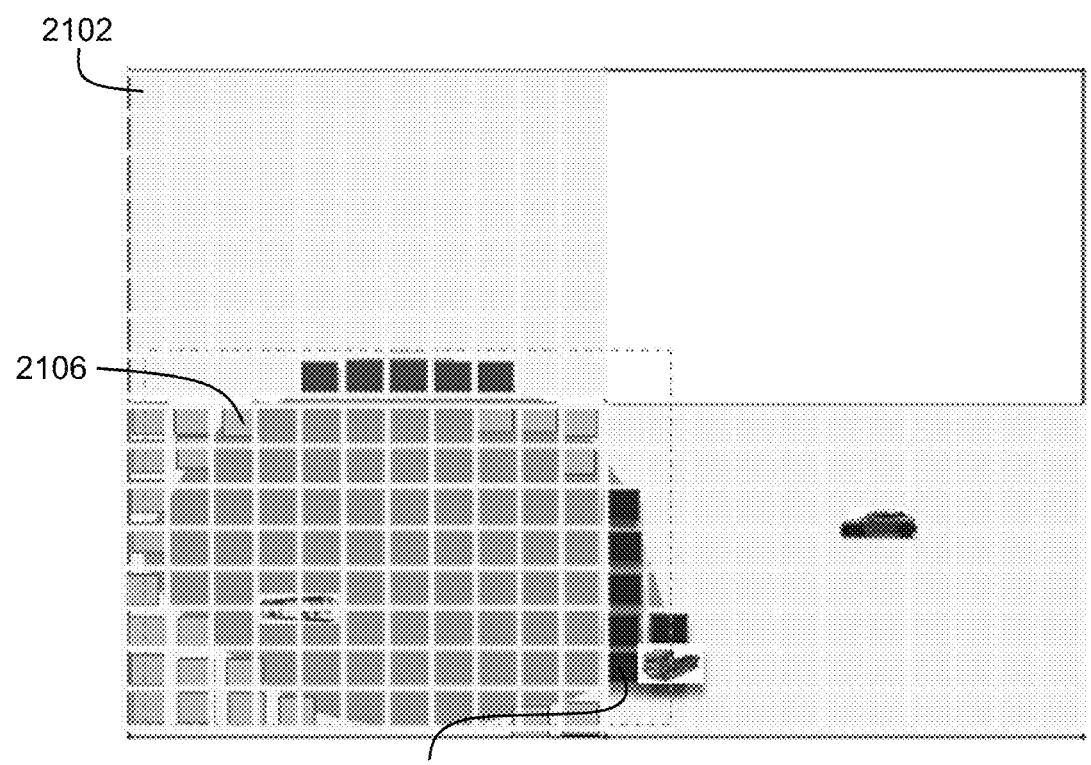
FIG. 21 is an illustration of a polygon context geometry in accordance with an aspect of the present disclosure.
Figure 22:
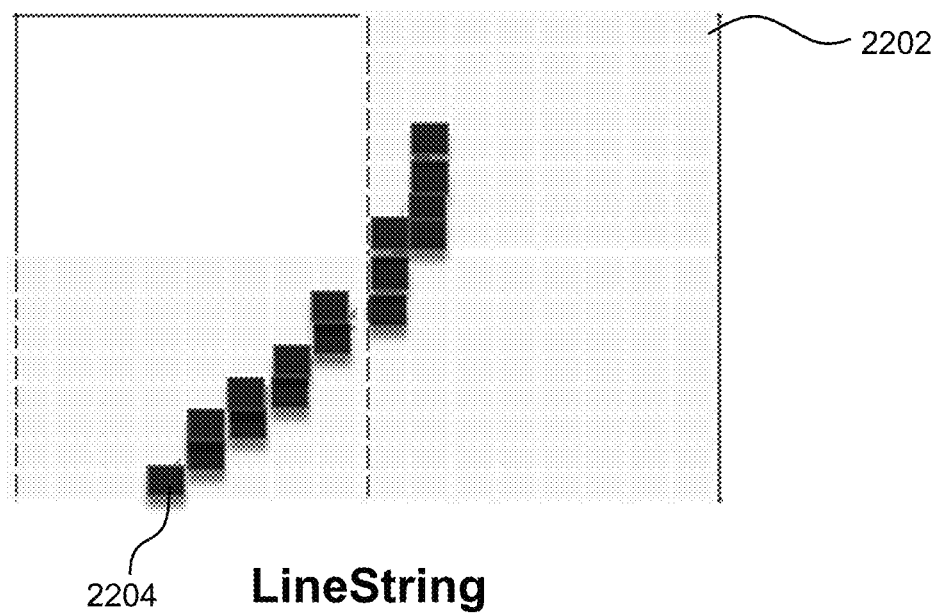
FIG. 22 is an illustration of a line string context geometry in accordance with an aspect of the present disclosure.
Figure 23:
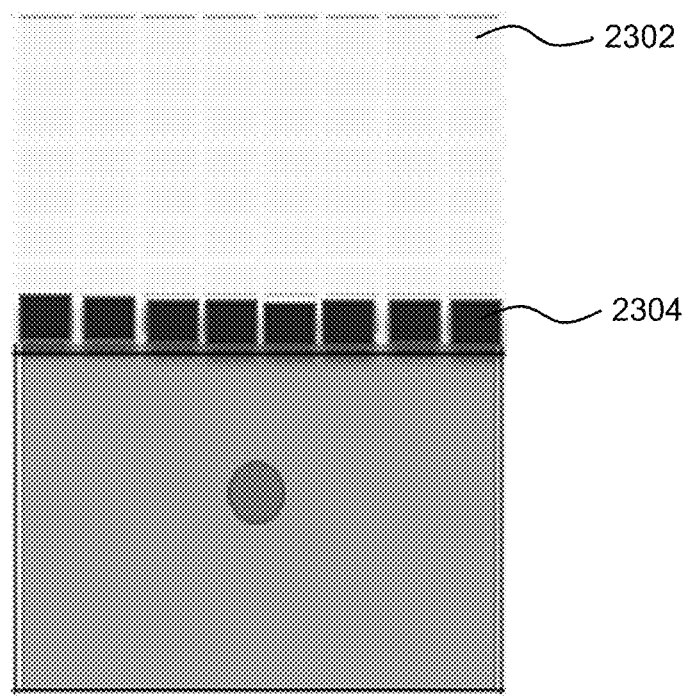
FIG. 23 is an illustration of a point [Grid] context geometry in accordance with an aspect of the present disclosure.

Referring now to FIGS. 21-23, polygon 2102, linestring 2202, and point[grid] 2302 spatial geometries are illustrated. In some aspects, the MBB scale size (µ) of a current type of context may be mapped to one or multiple MBB encodes of a corresponding scale level. In some aspects, a resolution based encode may also be used to filter the MBB encode. For example, further fine-grained encodes by scale level of the resolution may be used inside the MBB encode. As an example, a forward direction, as indicated, for example, by elements 2104 (FIG. 21), 2204 (FIG. 22), and 2304 (FIG. 23) may utilize a contain filter. For example, if there is a point located in element 2104, the point is contained by the MBB encode (e.g., 2104's upper grid), but the point is coarse and does not provide enough granularity to determine if there is a contain/nest(contained) relation of the point and the polygon object. Further filtering may be performed using resolution based encode (2104) to make the determination. If the point is still contained by 2104 after filtering using the resolution based encode, there is enough granulatiry to determine the contain relation of the point and the polygon object as a contain relation. Otherwise, the point and polygon object do not have a contain relation. As another example, a reverse direction, as indicated, for example, by elements 2106 (FIG. 21) may not utilize a contain filter. The forward or reverse direction encodes may be selected, for example, based on the coverage size of the MBB encode. For example, if the coverage size of the MBB encode is greater than a pre-determined amount of coverage, the reverse direction encode may be used. If the coverage size of the MBB encode is greater than the pre-determine amount of coverage, the forward direction encode may be used. In some aspects, the reverse direction encode may be used when the coverage size of the MBB encode is less than the pre-determine amount of coverage and the forward direction encode may be used when the coverage size of the MBB encode is greater than the pre-determine amount of coverage.

No-SQL Logical Table Schema for Context Based Spatial Query

Figure 24:
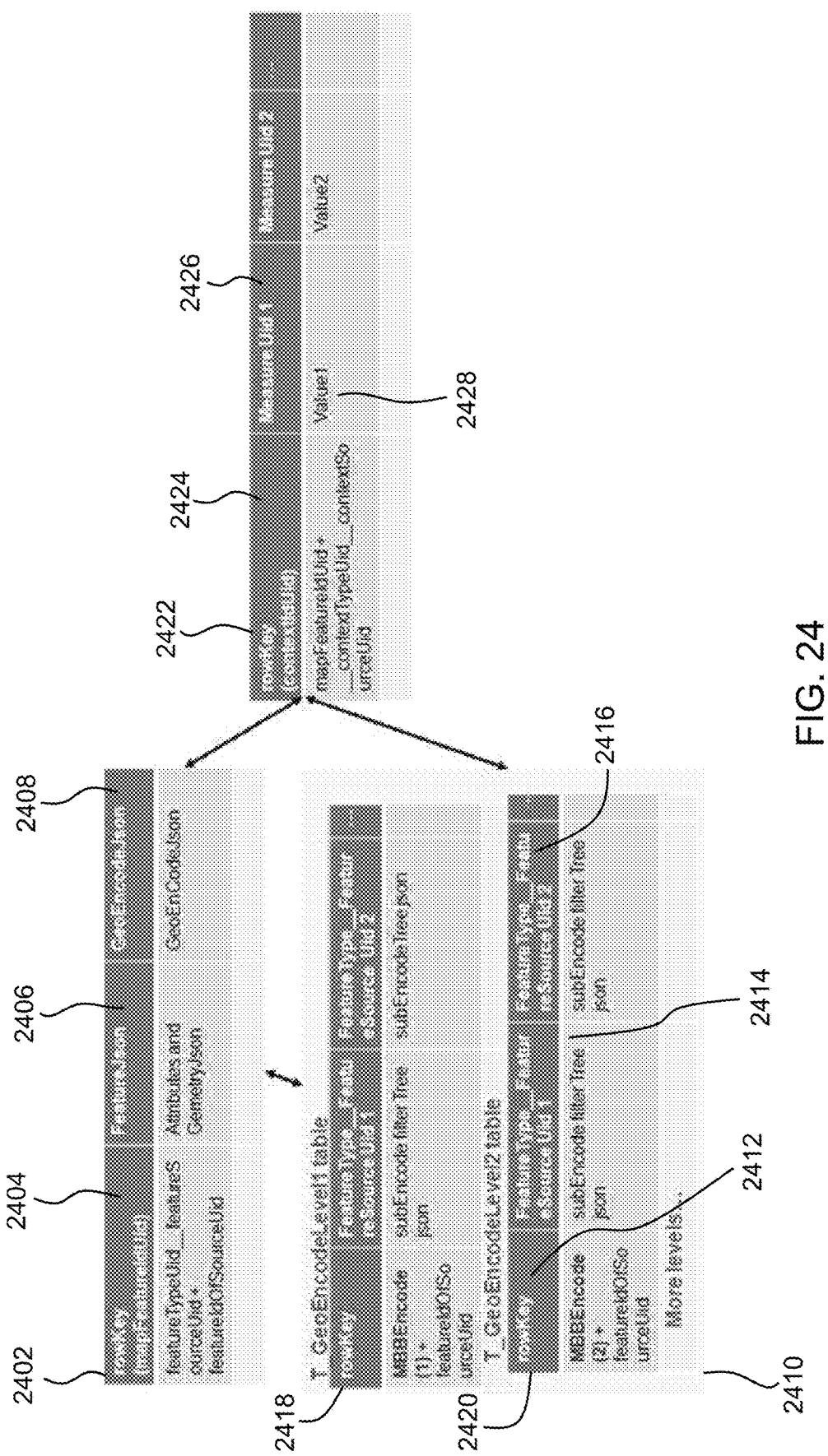
FIG. 24 is an illustration of example logical table schema for a context based spatial query in a No-SQL database in accordance with an aspect of the present disclosure.

Referring now to FIG. 24, in some aspects, an example for how to correspond No-SQL logical table schema for context based spatial queries is illustrated. In some aspects, a T_MapFeature table 2402 for a context object's attributes and geometry includes a rowKey 2404, a FeatureJson 2406, and a GeoEncodeJson 2408. rowKey 2404 may include featureTypeUid_featureSourceUid+featureIdOfSourceUid. featureTypeUId may be a unique id of feature type and may have a fixed length. featureSourceUid may be a unique id of feature source and may have a fixed length. featureIdOfSourceUid may be a unique id of the original id of the context in the source and may have a fixed length. The three Uids compose a unique rowkey and may have a fixed length. FeatureJson 2406 may be a GeoJson standard format of mapfeature objects and may include feature attributes and a GemetryJson, which present corresponding Json formats of geometries like polygon, lineString, point, grid etc.

Still referring to FIG. 24, in some aspects, T_GeoEncodeLevel tables 2410 corresponding to multiple scales of contexts are illustrated. Each T_GeoEncodeLevel table 2410 includes a rowKey 2412, a FeatureType_FeatureSource Uid 1 2414, and a FeatureType_FeatureSource Uid 2 2416. In some aspects, each level of T_GeoEncodeLevel tables 2410 may correspond to a scale of a context. For example, a context having scale level "one", such as that illustrated in FIG. 18, may have a corresponding table T_GeoEncodeLevel1 2418, and a context having scale level "two" may have a corresponding table T_GeoEncodeLevel2 2420.

Referring yet again to FIG. 24, in some aspects, a T_Context_Measure table 2422 including context measures is illustrated. T_Context_measure table 2422 may include a rowKey 2424 and Measure Uids 2426 for each context measure. rowKey 2424 may include mapFeatureIdUid+contextTypeUid_contextSourceUid. mapFeatureIdUid is rowKey 2402. contextTypeUid may be a unique id of context type and may have a fixed length. contextSourceUid may be a unique id of context source and may have a fixed length. The three Uids may compose a unique rowkey 2422 and may have a fixed length. Each measure Uid 2426 may include measure values 2428. For example, a context type may be airQuality, which may have multiple measures, e.g., pm2.5, So2, co etc. The measure Uid may be a unique name of measure and may have a corresponding value, e.g., a value for pm2.5 may be 120, stored in 2428.

In some aspects, the mapFeatureId Uid format may be equal to featureTypeUid_featureSourceUid+featureIdOfSourceUid. In some aspects, the ContextId Uid format may be equal to mapFeatureIdUid+_contextType_contextSourceUid. The Uid is the unique fixed length id corresponding to the original input.

System Architecture

Figure 25:
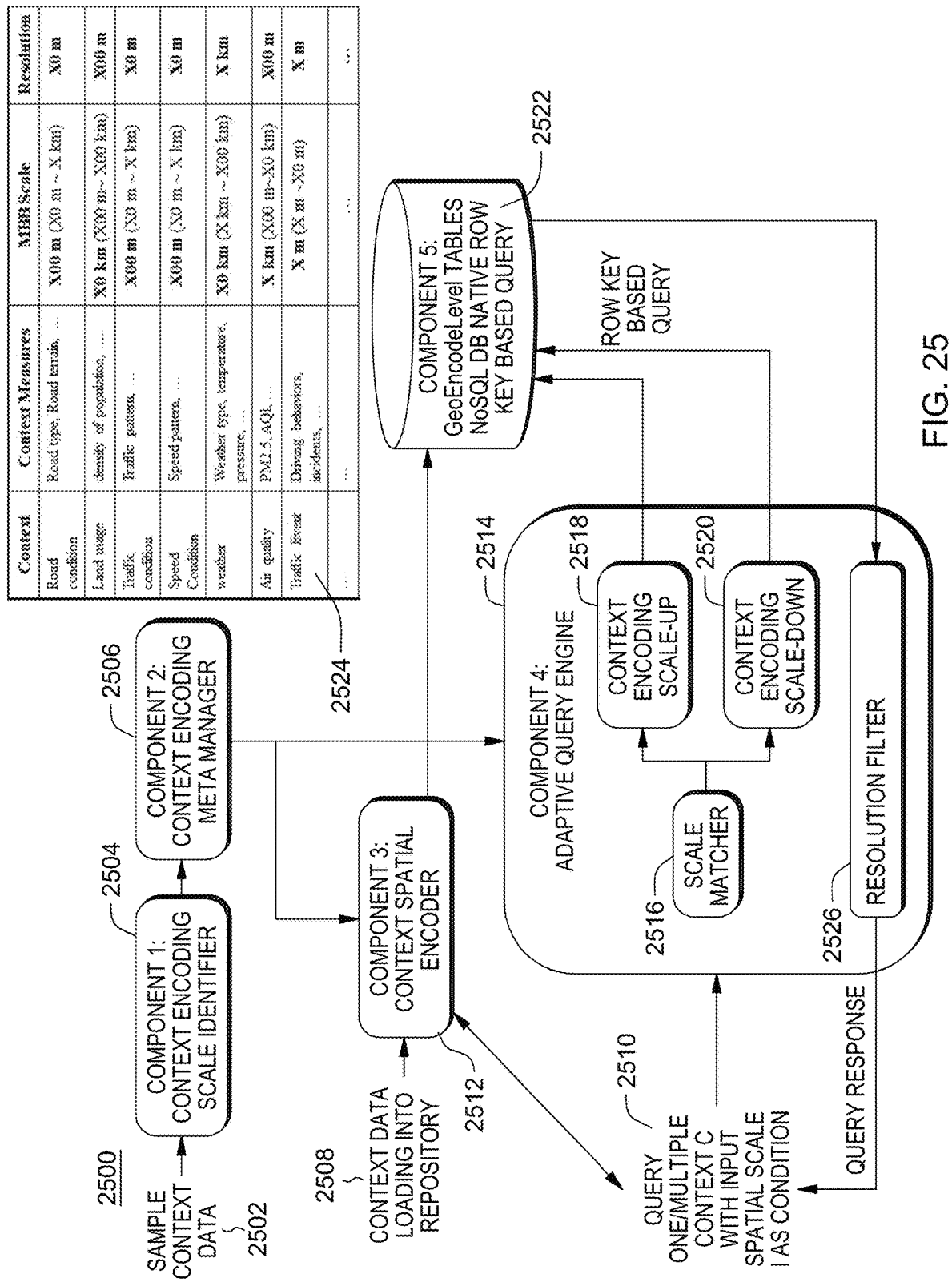
FIG. 25 is an illustration of a system architecture in accordance with an aspect of the present disclosure.

Referring now to FIG. 25, an example system architecture 2500 for encoding context data is disclosed. As illustrated, architecture 2500 includes, but is not limited to, five components including a context encoding scale identifier 2504, a context encoding meta manager 2506, a context spatial encoder 2512, an adaptive query engine 2514, and a GeoEncodelevel Tables No-SQL Database 2522.

Context encoding scale identifier 2504 receives sample context data 2502 as an input and identifies the encoding scale for the context. The sample context data may be received from an existing context, e.g. road links, air stations etc., which can present distribution characters of scale size of the type of context. For example, considering a type of context that is near normal distribution as illustrated in FIG. 13, the context encoding scale identifier may use format 1304 to calculate out the μ (1208).

Figure 28:
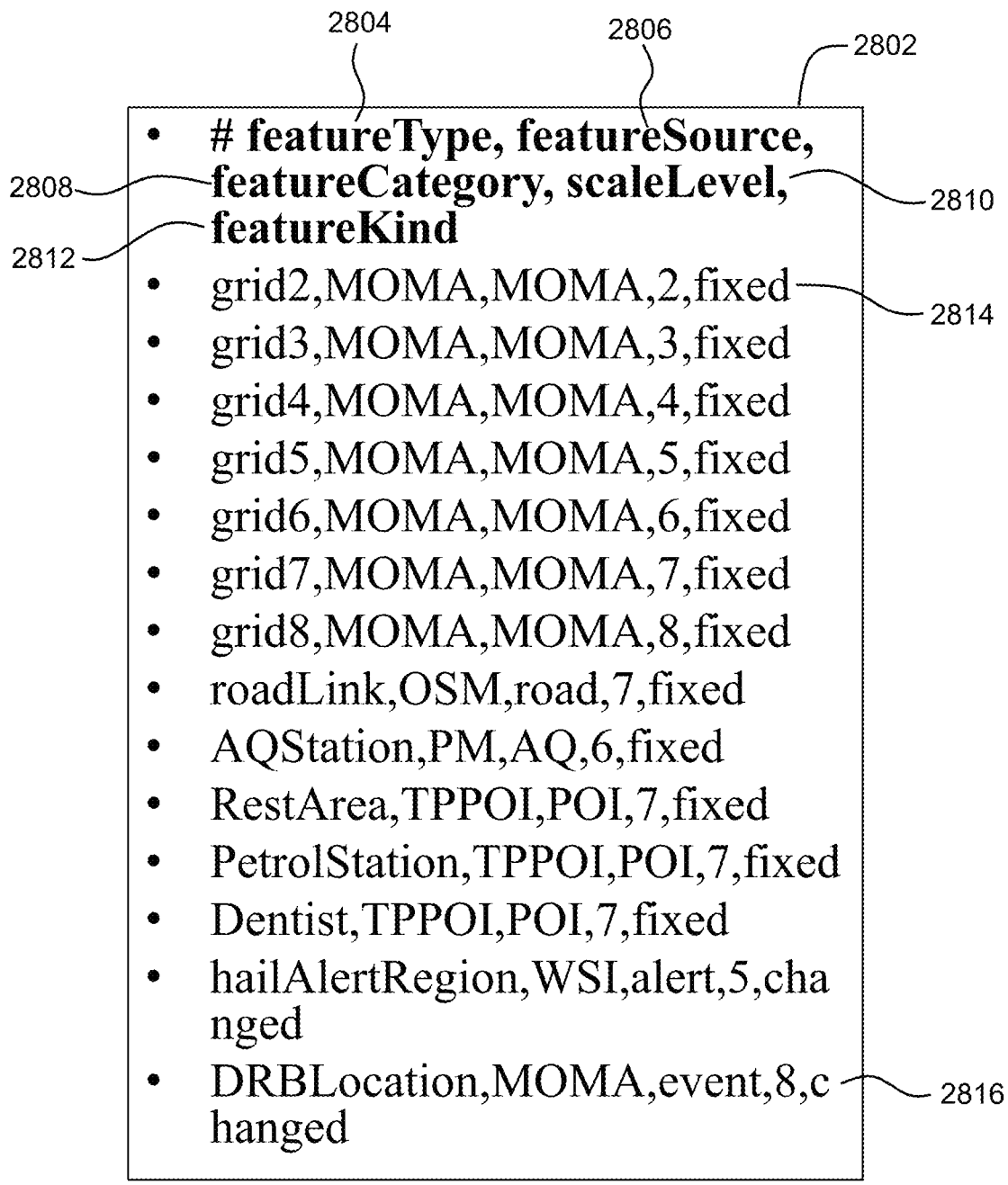

Context encoding meta manager 2506 receives the identified encoding scale for the context and stores it into the scalelevel 2810 of the meta repository illustrated in FIG. 28.

New context data 2508 is loading into system, and context spatial encoder 2512 queries context encoding Meta manager 2506 to receive corresponding Meta information (e.g. scale level etc.) of the context type. Context spatial encoder 2512 encodes the new context object as its scale level. Corresponding result (encodes) will be stored into 2522, including tables 2402/2420/2422 from FIG. 24. In another aspect, queries 2510 may include, for example, one or multiple contexts C targeted/returned and conditions (e.g., spatial scope, time scope etc.). Queries 2510 may be sent to 2514 to execute and return corresponding context objects.

Adaptive query engine 2514 includes a scale matcher component 2516, a context encoding scale-up component 2518, a context encoding scale-down component 2520, and a resolution filter 2526. Adaptive query engine 2514 receives queries 2510, the corresponding spatial encode of spatial scope of current condition (like a grid) from context spatial encoder 2512, which scale level is based on its actual MBB scale. If condition is an existing context in system, then query Context Encoding Meta manager to get its corresponding scale.

Scale matcher component 2516 may compare the scale level of query condition 2510 to the targeted context encoding scale identified by context encoding scale identifier 2504 as received from context encoding Meta manager 2506. In some aspects, if the scale of the query 2510 is greater than the encoding scale identified by context encoding scale identifier 2504, context encoding scale-up component 2518 may be used to submit a rowKey based query to the GeoEncodelevel Tables NoSQL Database 2522 for the encoding scale corresponding to the scale level of query condition. For example, if the scale level of the query condition is 8, for which the encode is 'wxeft40d', and the scale level of the targeted context is 4, then the first 4 chars 'wxef' of 'wxeft40d' may be used as a query condition on GeoEncodelevel table. In some aspects, if the scale level of the query 2510 is less than the encoding scale identified by context encoding scale identifier 2504, context encoding scale-down component 2520 may be used to submit a rowKey based query to the GeoEncodelevel Tables NoSQL Database 2522 for the encoding scale corresponding to the spatial scale level of query condition. For example, if the scale level of the query condition is 5, for which the encode is 'wxefe', and the scale level of targeted context is 7, 'wxeft' may be extended to extend to 7 characters with a scope from 'wxeft00' to 'wxeftzz' as range query condition on GeoEncodelevel table.

In response to the query, GeoEncodelevel Tables NoSQL Database 2522 may return context data at the submitted scale level to adaptive query engine 2514. Adaptive query engine 2514 may further filter the returned context data using a resolution filter 2526 and provide the output of the resolution filter 2526 as a response to query 2510. For example, the resolution filter may filter the returned context data based using the resolution for the targeted context in question according to chart 2524.

GeoEncodelevel Tables NoSQL Database 2522 may include multi-scale context information for various contexts that may be the subject of a query. Each GeoEncoder table may map to a particular context and scale level with a fixed length.

Referring now to FIG. 26, an example of returned data from GeoEncodelevel Tables NoSQL Database 2522 is illustrated. In this example, a scale down (contain) was used on a contained weather area query. For example, weather area geometry (e.g., a context) may be received as an input as follows: "{\"type\":\"Polygon\",\"coordinates\": [[[117.0703125,39.90234375],[117.0703125,40.078125], [117.421875,40.078125],[117.421875,39.90234375], [117.0703125,39.90234375]]]}";

The encode for the weather region is wx57 while a road link scale level of 7 is received as part of the query. Scale matcher 2516 determines that the scale of the encode, e.g., a scale of four, does not match the road link scale level of seven and determines that a scale-down is required. Context encoding scale-down component 2520 scales the original encode wx57 down from a scale of four to a scale of seven, e.g., the query for wx57 becomes a query for wx57000~wx57zzz. A range scan query may then be applied to GeoEncodelevel Tables NoSQL Database 2522 using the scaled down encode wx57000~wx57zzz. The result returned from GeoEncodelevel Tables NoSQL Database 2522 may by filtered based on resolution, e.g., by X km for weather, and a roadLink set may be returned as the response to the query.

The roadLink set may, for example, have a type "ContextCollection" 2602 and may include one or more contexts 2604. Each context may include a contextId 2606, e.g., "roadLink_OSM_bj35531_roadCondition_OSM", a mapFeatureURI 2608, e.g., "mapfeatures/roadLink_OSM_bj35531", a status 2610, e.g., "static", "dynamic", etc., a contextSource 2612, e.g., "OSM", HereMap, etc., a contextType 2614, e.g., "roadCondition", "LandUsage", etc., and measures 2616.

Referring now to FIG. 27, another example of returned data from GeoEncodelevel Tables NoSQL Database 2522 is illustrated. In this example, a scale up (Nest/contained) was used on a GPS point/road link query for weather and air quality. For example, the GPS point geometry (e.g., a context) may be received as an input as follows: "{'type': 'Point','coordinates': [116.281561,40.042475]}";

The encode for the GPS point geometry is wx4ey198k according to its MMB scale by context spatial encoder 2512 while a weather scale level of four is received as part of the query. Scale matcher 2516 determines that the scale of the encode, e.g., a scale of nine, does not match the weather scale level of four and determines that a scale-up is required. Context encoding scale-up component 2518 scales the original encode wx4ey198k up from a scale of nine to a scale of four, e.g., the query for wx4ey198k becomes a query for wx4e. A range/get scan query may then be applied to GeoEncodelevel Tables NoSQL Database 2522 using the scaled up encode wx4e. The result returned from GeoEncodelevel Tables NoSQL Database 2522 may by filtered based on resolution, e.g., by X km for weather, and weather information for the GPS point may be returned as the response to the query.

The weather information may, for example, be a JSON 2702 including one or more contexts 2704. An example context 2706 may include a contextId 2708, e.g., "grid4_MOMA_wx4e_dailyWeather_Source".

Context 2706 may also include a mapFeatureREF 2710. mapFeatureREF 2710 may include a mapFeatureId, e.g., "grid4_MOMA_wx4e", a geometry 2714, and properties 2720. Geometry 2714 may include coordinates 2716 and a type 2718, e.g., "polygon", LineString, Point[Grid] or any other type. Properties 2720 may include a type 2722, e.g., "feature".

Context 2706 may also include a contextSource 2724, e.g., a company or institution providing the context data, and a contextType 2726, e.g., dailyWeather, hourlyWeather, airQuality, or other context types including those shown in the first column of FIG. 29.

Context 2706 may also include measures 2728. For example, measures 2728 may include sunset 2730, e.g., "6:13 pm", weatherType 2732, e.g., "PM Rain", sunrise 2734, e.g., "5:59 am", MOMAWeatherType 2736, e.g., "rainy", and temperature 2738, e.g., "12, 27". Any other measure may also be included.

Context 2706 may also include a time value 2740, e.g., "2015-09-22 00:00:00. 0", and a status value 2742, e.g., "dynamic", "static", etc.

Referring now to FIGS. 28 and 29, scale level meta definitions 2802 and 2902 for contexts are illustrated. For example, with reference to FIG. 28, scale level meta definition 2802 for a context may include the categories featureType 2804, featureSource 2806, featureCategory 2808, scaleLevel 2810, and featureKind 2812. An example context definition 2816 may include a featureType 2804 of "DRBLocation", featureSource 2806 of "MOMA", featureCategory 2808 of "event", scaleLevel 2810 of "8", and a featureKind 2812 of "changed".

With reference now to FIG. 29, an example scale level meta definition 2902 for a context may include the categories contextType 2904, contextSource 2906, contextCategory 2908, featureType 2910, featureSource 2912, status 2914, sampleRate 2916, scaleLevel 2918, featureKind 2920. An example context definition 2922 may include a contextType 2904 of "dailyWeather", contextSource 2906 of "Company A", contextCategory 2908 of "weather", featureType 2910 of "grid4", featureSource 2912 of "MOMA", status 2914 of "dynamic", sampleRate 2916 of "daily", scaleLevel 2918 of "4", and a featureKind 2920 of "fixed". The scale level meta definitions 2802 and 2902 may be used, for example, by context encoding meta manager 2506 (FIG. 25) to store the identified scale and other context data received from context encoding scale identifier 2504 (FIG. 25).

Figure 30:
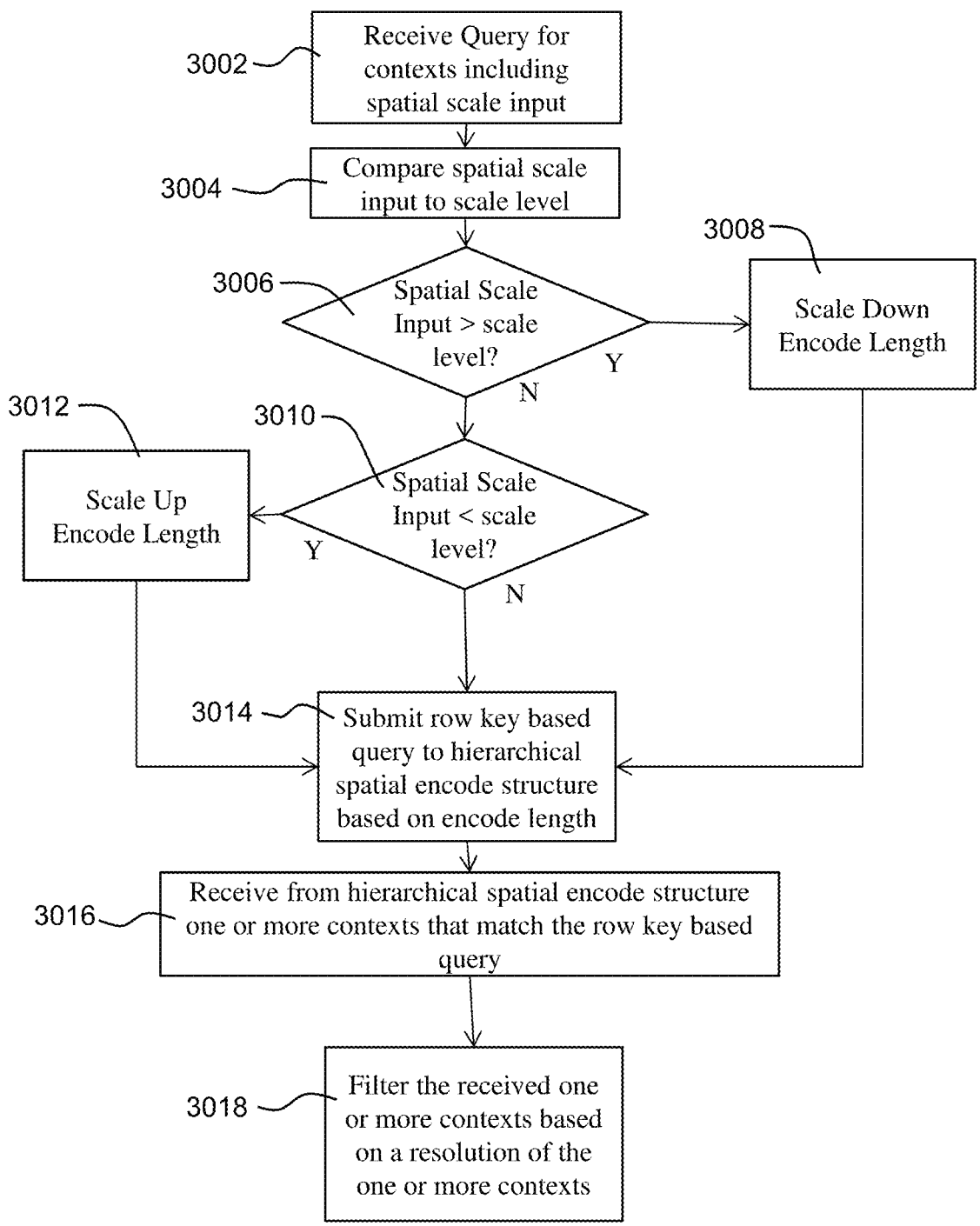
FIG. 30 illustrates a method in accordance with an aspect of the present disclosure.

With reference now to FIG. 30, a method 3000 for adaptively querying a hierarchical spatial encode structure of a No-SQL database is disclosed. At 3002, a query is received for one or more contexts of the hierarchical spatial encode structure. The query may include a spatial scale input as a condition. At 3004, the spatial scale input is compared to a scale level of the one or more contexts of the hierarchical spatial encode structure. At 3006, a determination of whether the spatial scale input is greater than the scale level is made based on the comparison. At 3008, if the spatial scale input is determined to be greater than the scale level, the encode length is scaled down to the spatial scale input, e.g., if the scale level is four and the spatial scale input is 7, the original encode length of four, e.g., wx57, is scaled down to an encode length corresponding to the spatial scale input of seven, e.g., encodes in the range of wx57000~wx57zzz. At 3010, if the spatial scale input is not determined to be greater than the scale level, a determination of whether the spatial scale input is less than the scale level is made based on the comparison. At 3012, if the spatial scale input is determined to be less than the scale level, the encode length is scaled up to the spatial scale input, e.g., if the scale level is nine and the spatial scale input is four, the original encode length of nine, e.g., wx4ey198k, is scaled up to an encode length corresponding to the spatial scale input of four, e.g., the encode wx4e. At 3014, a row key based query is submitted to the hierarchical spatial encode structure based on the encode length (scaled down, scaled up, or unchanged). At 3016, one or more contexts that match the row key based query are received from the hierarchical spatial encode structure. At 3018, the received one or more contexts may be further filtered based on the resolution of the one or more contexts.

Figure 31:
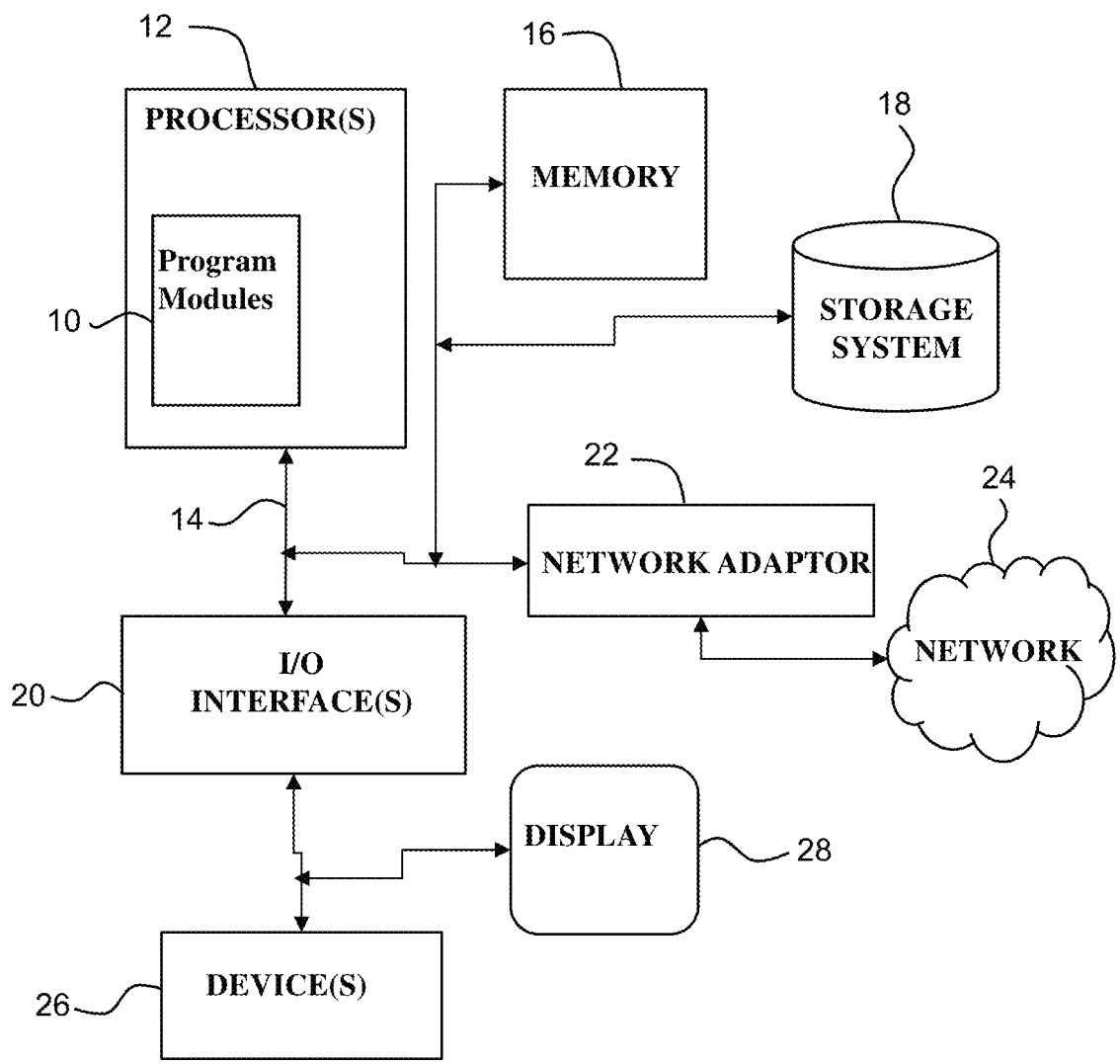
FIG. 31 illustrates a schematic of an example computer or processing system that may implement any component of the system of FIG. 1 in accordance with an aspect of the present disclosure.

FIG. 31 illustrates a schematic of an example computer or processing system that may implement the features describe above including architecture 2500 in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the architecture shown in FIG. 2500 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of the computer system may include, but are not limited to, one or more processors or processing units 12, a system memory 16, and a bus 14 that couples various system components including system memory 16 to processor 12. The processor 12 may include one or more program modules 10 that perform the methods described herein. The program modules 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages, a scripting language such as Perl, VBS or similar languages, and/or functional languages such as Lisp and ML and logic-oriented languages such as Prolog. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The computer program product may comprise all the respective features enabling the implementation of the methodology described herein, and which—when loaded in a computer system—is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and/or server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

What is claimed is:

1. A system comprising:
    at least one processor;
    at least one data repository operatively associated with the at least one processor and configured to store a hierarchical spatial encode structure, the hierarchical spatial encode structure comprising a plurality of scale levels each having a plurality of encode expressions for a multi-scale context, said encode expressions associated with a plurality of context types of differing spatial scales or resolutions corresponding to conditions that affect a current location;
    memory storing instructions that, when executed by the at least one processor, configure the at least one processor to:
        receive a current context data of an associated current condition and to identify from the context data a scale level of the associated spatial scope of the current condition;
        translate the received context data into an encoded expression of the hierarchical spatial encode structure based at least in part on the identified scale level, the translation of the received context data into an encoded expression comprising translating a two dimensional spatial contain/nest (contained) relations of the context into one-dimensional unified pre-encode expressions to support row key range queries in a No-SQL database;
        receive a query for one or more contexts of the hierarchical spatial encode structure, the query including a spatial scale input as a condition; and
        dynamically adapt the received query to the associated spatial scope of the current condition by further configuring the at least one processor to:
            compare the spatial scale input to a scale level of the one or more contexts of the hierarchical spatial encode structure;
            determine based on the comparison whether the spatial scale input is greater than, equal to, or less than the scale level for the one or more contexts;
            if the spatial scale input is determined to be greater than the scale level for the one or more contexts, scale down the length of an encode expression for the one or more contexts to match the spatial scale input and submit a row key based query to the hierarchical spatial encode structure based at least in part on the scaled down length of the encode expression;
            if the spatial scale input is less than the scale level for the one or more contexts, scale up the length of the encode expression for the one or more contexts to match the spatial scale input and submit a row key based query to the hierarchical spatial encode structure based at least in part on the scaled up length of the encode expression;
            if the spatial scale input is the same as the scale level for the one or more contexts, submit a row key based query to the hierarchical spatial encode structure based at least in part on the length of the encode expression; and
            return, based on the submitted row key based query, one or more contexts that match the query.

2. The system of claim 1, wherein the encode expressions of the hierarchical spatial encode structure are configured in a left-to-right format to support a left fuzzy range query of a No-SQL database.

3. The system of claim 1, wherein the one or more contexts that match the query are further filtered based on a resolution of the one or more contexts.

4. The system of claim 1, wherein the encode expressions on a first of the scale levels of the hierarchical spatial encode structure comprise a first length, the encode expressions on a second of the scale levels of the hierarchical spatial encode structure comprise a second length greater than the first length, and each encode expression of the second of the scale levels comprises one or more of the encode expressions of the first of the scale levels.

5. The system of claim 1, wherein the hierarchical spatial encode structure comprises a plurality of geoencode tables, each geoencode table corresponding to one or more of the encode expressions on a scale level and comprising context data at the scale level of the respective encode expression.

6. The system of claim 5, wherein the row key based query is a range scan of the geoencode tables in No-SQL.

7. The system of claim 1, wherein a geometry of each context comprises at least one of a polygon, a point[Grid] and a LineString.

8. A method performed by at least one hardware processor comprising:
    receiving a query for one or more contexts of a hierarchical spatial encode structure, the query comprising a spatial scale input as a condition, the hierarchical spatial encode structure comprising a plurality of scale levels each having a plurality of encode expressions for a multi-scale context, said encode expressions associated with a plurality of context types of differing spatial scales or resolutions corresponding to conditions that affect a current location, wherein two dimensional spatial contain/nest (contained) relations of a context are translated into one-dimensional unified pre-encode expressions to support row key range queries in a No-SQL database, the hierarchical spatial encode structure storing the one-dimensional unified pre-encode expression; and
    dynamically adapting said query to an associated spatial scope of a current condition included in a current received context data:
    comparing the spatial scale input to a scale level of the one or more contexts of the hierarchical spatial encode structure, the scale level associated with the spatial scope of the current condition;
    based on the comparison, at least one of scaling down the length of an encode expression for the one or more contexts, scaling up the length of an encode expression for the one or more contexts, or leaving the length of an encode expression for the one or more contexts unchanged, wherein the length of the encode expression is scaled down when the spatial scale input is greater than the scale level of the one or more contexts, the length of the encode expression is scaled up when the spatial scale input is less than the scale level for the one or more contexts, and the length of the encode expression is left unchanged when the spatial scale input is the same as the scale level for the one or more contexts;

submitting a row key based query to the hierarchical spatial encode structure based at least in part on the scaled up, scaled down, or unchanged length of the encode expression;

receiving from the hierarchical spatial encode structure one or more contexts that match the row key based query.

9. The method of claim 8, wherein the encode expressions of the hierarchical spatial encode structure are configured in a left-to-right format to support a left fuzzy range query of a No-SQL database.

10. The method of claim 8, wherein the one or more contexts received from the hierarchical spatial encode structure that match the row key based query are further filtered based on a resolution of the one or more contexts.

11. The method of claim 8, wherein the encode expressions on a first of the scale levels of the hierarchical spatial encode structure comprise a first length, the encode expressions on a second of the scale levels of the hierarchical spatial encode structure comprise a second length greater than the first length, and each encode expression of the second of the scale levels comprises one or more of the encode expressions of the first of the scale levels.

12. The method of claim 8, wherein the hierarchical spatial encode structure comprises a plurality of geoencode tables, each geoencode table corresponding to one or more of the encode expressions on a scale level and comprising context data at the scale level of the respective encode expression, the one or more contexts that match the row key based query received from the hierarchical spatial encode structure comprising the corresponding geoencode tables.

13. The method of claim 12, wherein the row key based query is a range scan of the geoencode tables in No-SQL.

14. The method of claim 8, wherein a geometry of each context comprises at least one of a polygon, a point[Grid] and a LineString.

* * * * *